United States Patent [19]
Lacombe et al.

[11] Patent Number: 5,358,451
[45] Date of Patent: Oct. 25, 1994

[54] DEVICES ENABLING SHIFTING OF GEARS ON BICYCLES

[75] Inventors: Jean-Pierre Lacombe, Chavanod; Jean-Pierre Mercat, Cran-Gevrier, both of France

[73] Assignee: B. G. Innovation (S.A.R.L.), Annecy Cedex, France

[21] Appl. No.: 22,953

[22] Filed: Feb. 25, 1993

[30] Foreign Application Priority Data

Feb. 27, 1992 [FR] France .................. 92 02553

[51] Int. Cl.$^5$ .............................. F16H 61/00
[52] U.S. Cl. .......................... 474/78; 474/80
[58] Field of Search .............. 474/69, 70, 77–82

[56] References Cited

U.S. PATENT DOCUMENTS

| | | |
|---|---|---|
| 3,919,891 | 11/1975 | Stuhlmuller et al. |
| 4,530,678 | 7/1985 | Wechsler . |
| 4,619,631 | 10/1986 | Darby .................. 474/80 X |
| 4,728,316 | 3/1988 | Darby .................. 474/80 |
| 4,731,046 | 3/1988 | Juy .................... 474/80 |
| 4,861,320 | 8/1989 | Nagano . |
| 4,887,990 | 12/1989 | Bonnard et al. ......... 474/78 |
| 4,889,354 | 12/1989 | Wen . |
| 4,894,046 | 1/1990 | Browning .............. 474/80 X |
| 4,946,425 | 8/1990 | Buhlmann . |

FOREIGN PATENT DOCUMENTS

| | | |
|---|---|---|
| 0148781 | 7/1985 | European Pat. Off. . |
| 0336033 | 10/1989 | European Pat. Off. . |
| 2247376 | 5/1975 | France . |
| 2471908 | 6/1981 | France . |
| 2610061 | 7/1988 | France . |
| 2620104 | 3/1989 | France . |
| 2637249 | 4/1990 | France . |
| 2639313 | 5/1990 | France . |
| 8801962 | 3/1988 | World Int. Prop. O. . |

*Primary Examiner*—Thuy M. Bui
*Attorney, Agent, or Firm*—Sandler, Greemblum & Bernstein;

[57] ABSTRACT

Gear shifting device for a cycle having a chain and pinion transmission is provided, which includes a mobile gear shift assembly adapted to laterally displace the chain for enabling passage from one gear to another gear; transformation elements for transforming rotation of at least one pivoting gear into a lateral displacement of the mobile gear shift assembly; and a control mechanism for controlling lateral displacement of the mobile gear shift assembly. Further, the gear shifting device can include an indexing mechanism to further ensure exact positioning of the gears.

20 Claims, 18 Drawing Sheets

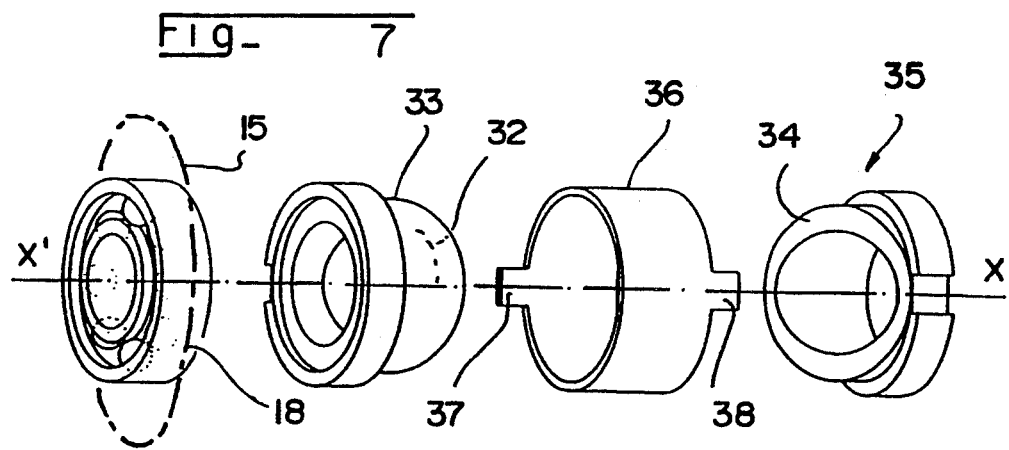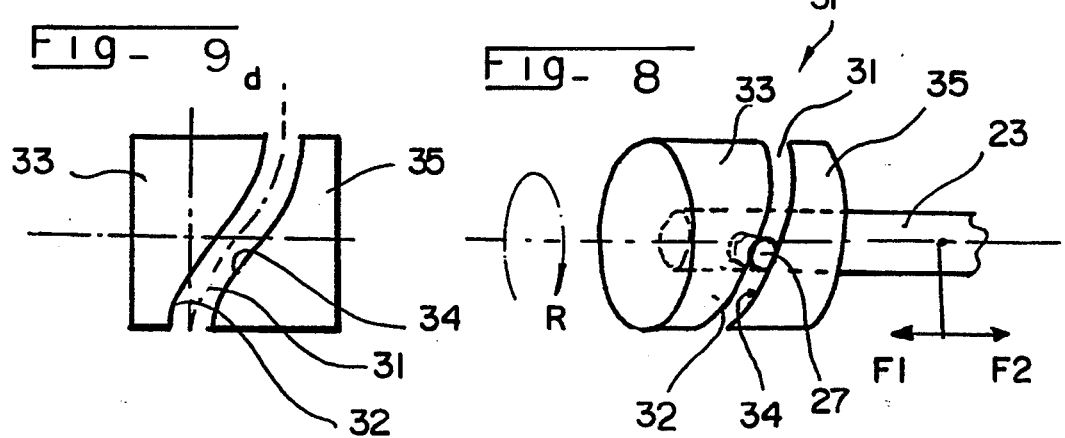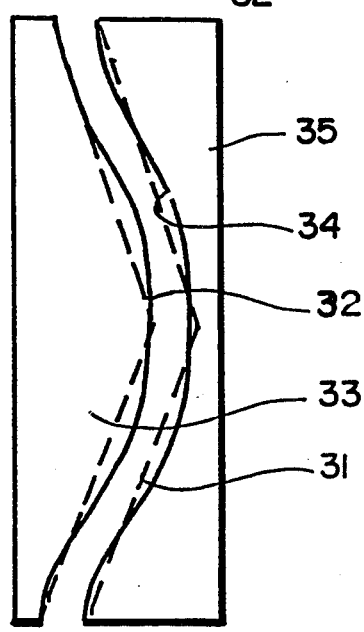

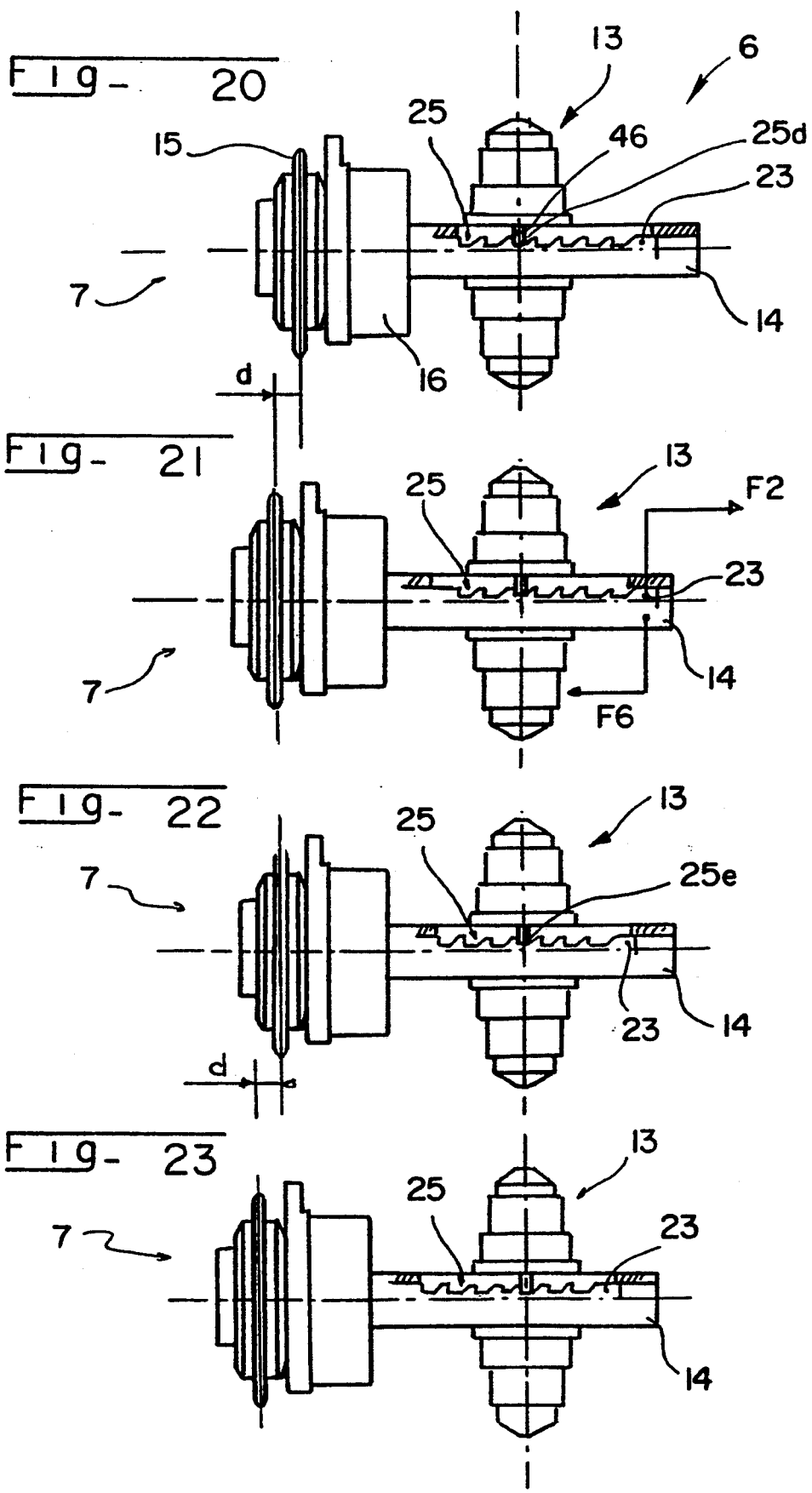

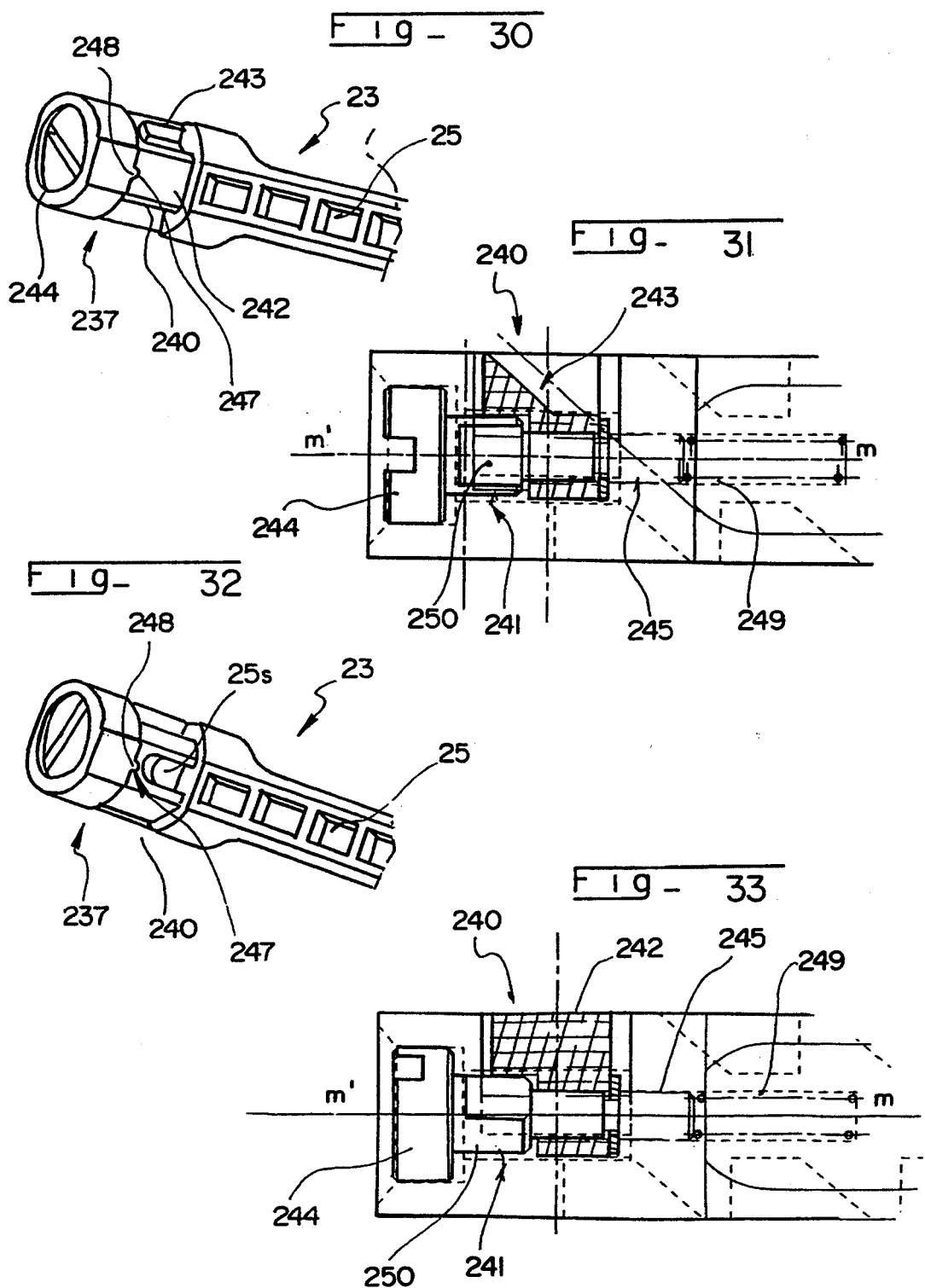

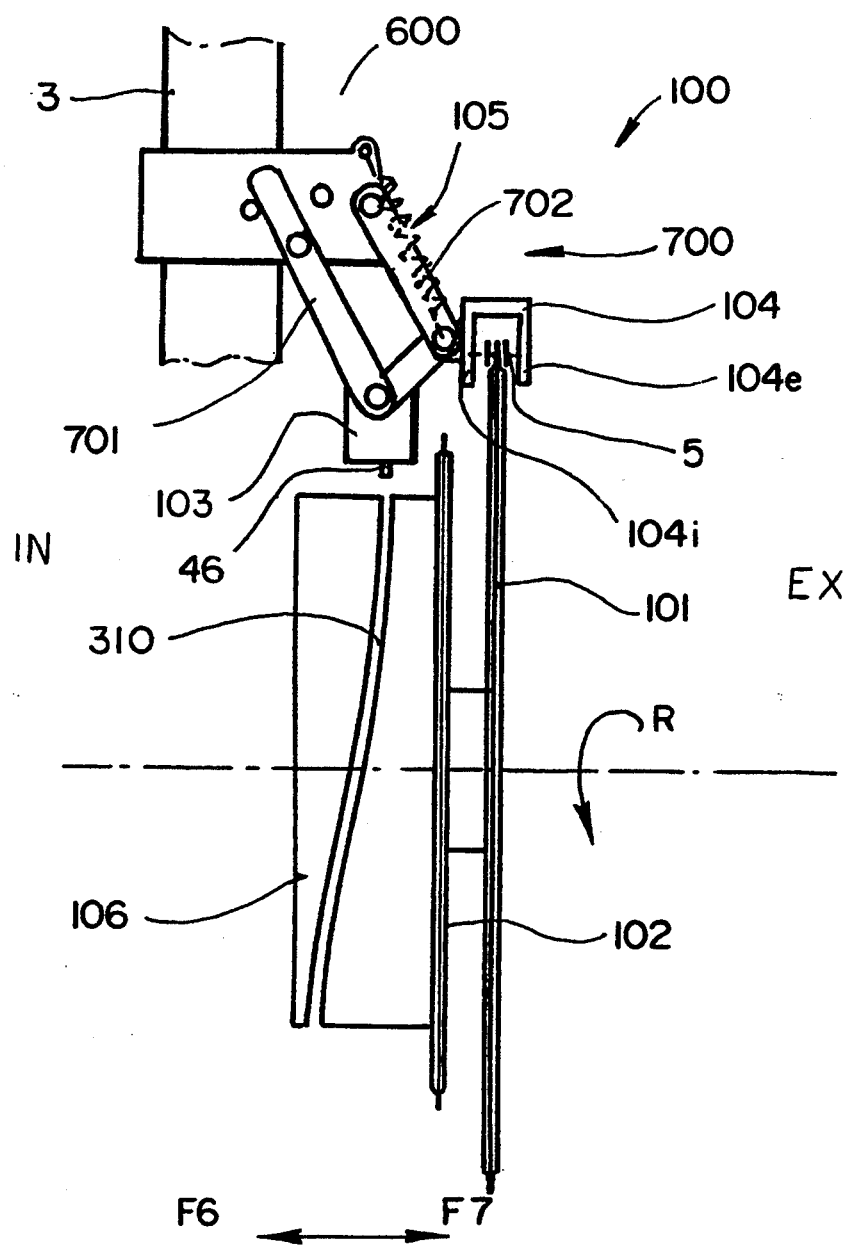

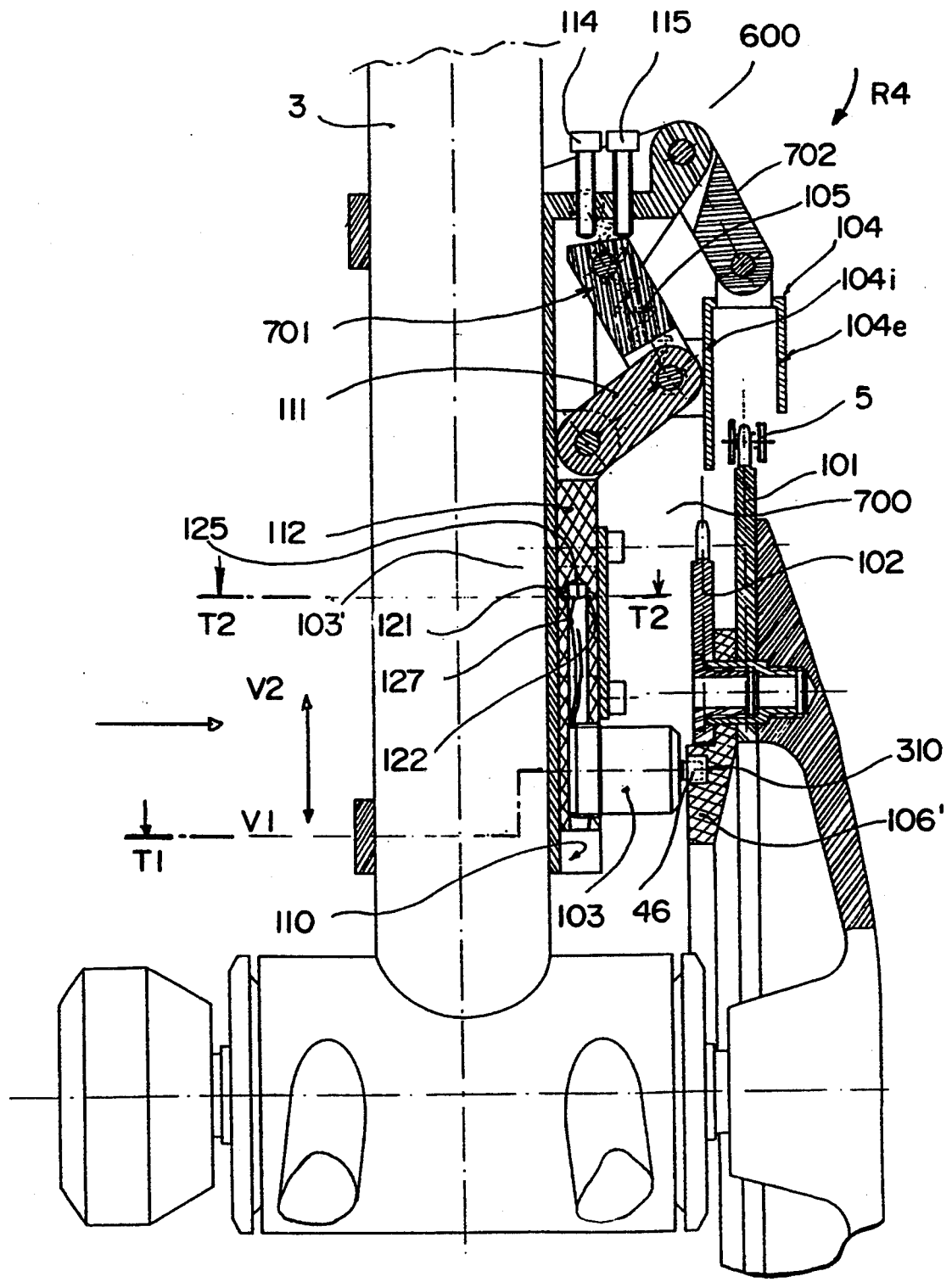

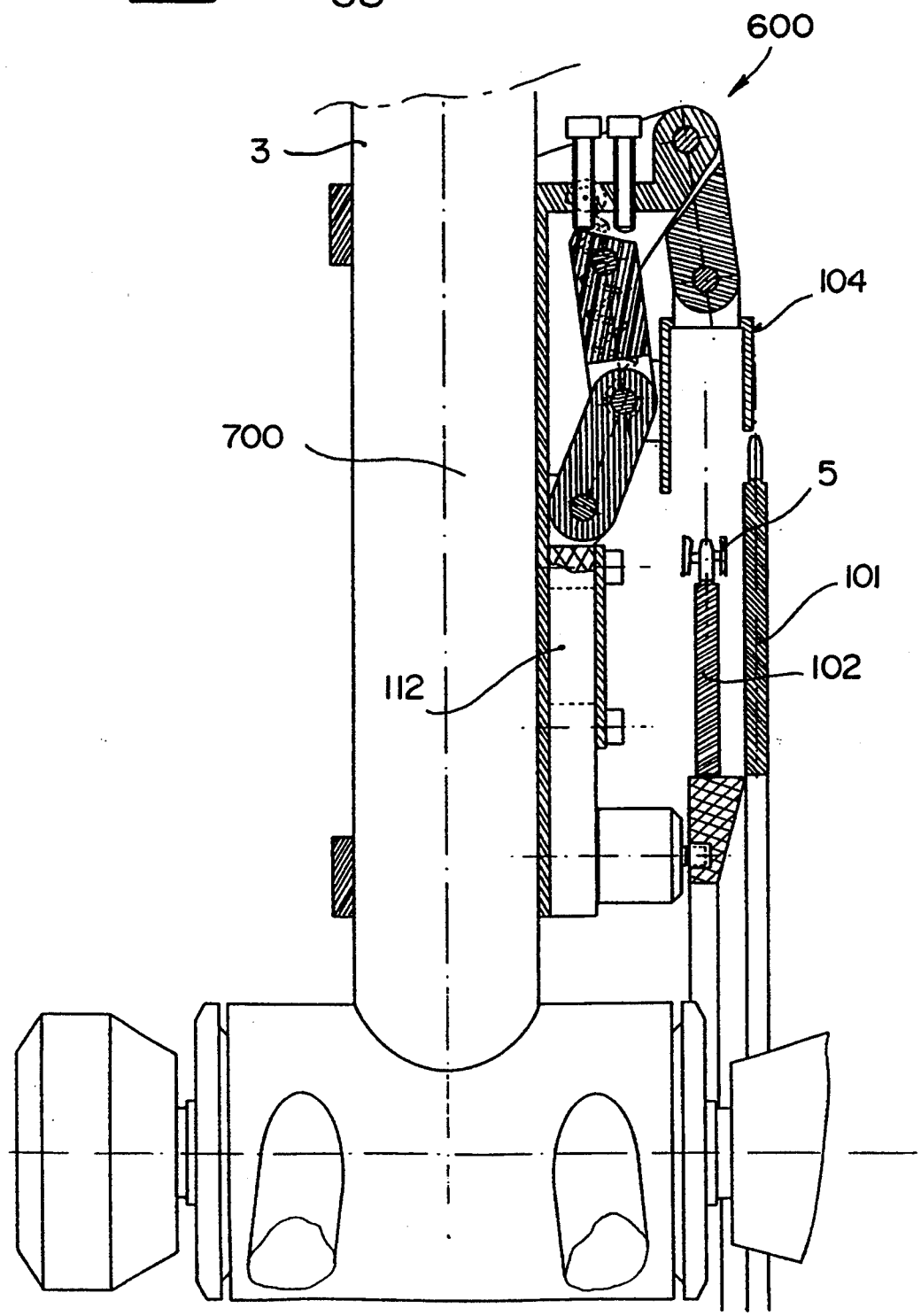

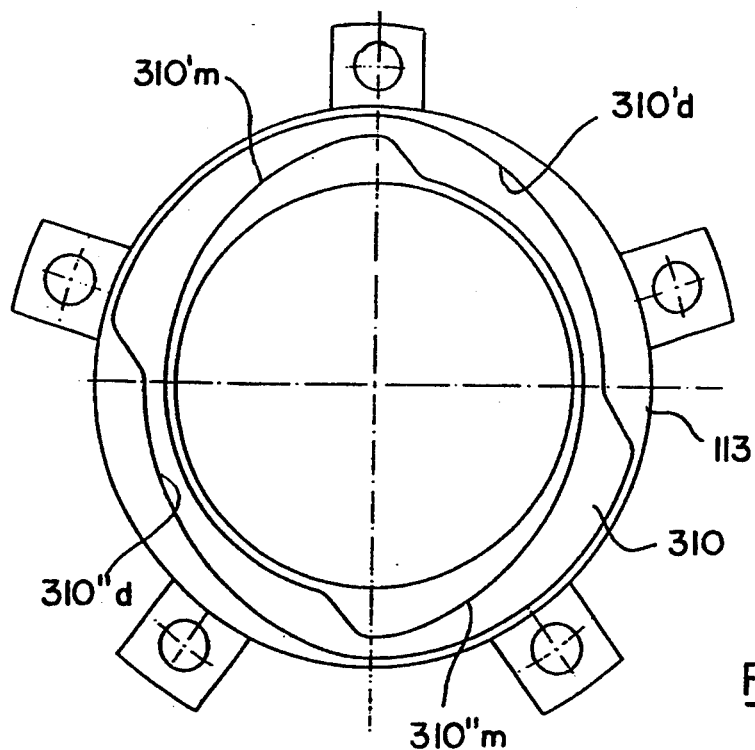
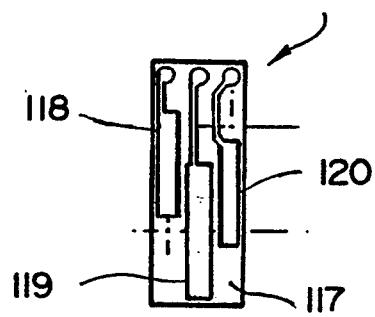
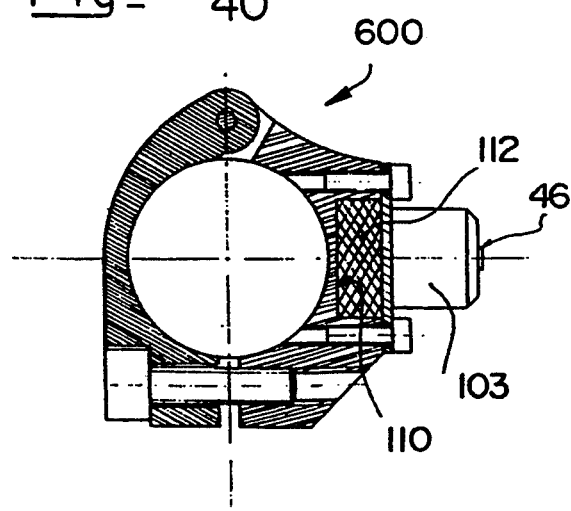
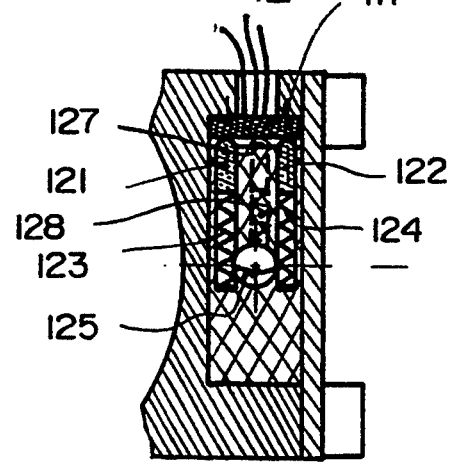

DEVICES ENABLING SHIFTING OF GEARS ON BICYCLES

BACKGROUND OF THE INVENTION

1. Field of the Invention

The present invention is related to devices enabling shifting of gears for bicycles of the type having a chain and pinion transmission.

2. Discussion of Background Material

In currently known bicycles, gear shifting is done by means of a device ensuring the displacement of the chain in engagement with a gear, towards another gear of a different diameter, thus ensuring a modification of the transmission ratio. We are aware of devices of this type, also called gear shift devices, and which comprise an upper body fixed to the frame of the bicycle, and a lower body retaining the chain, which is movably connected with respect to the upper body by a parallelogram-shaped structure capable of oscillating transversely in order to laterally displace the chain and enable the various gear shifts. The parallelogram-shaped structure is constituted by a fairly complex assembly having a plurality of rotational connection rods. The movements of the parallelogram are controlled by the action of a flexible metallic cable, whose end is connected to a lever fixed on the frame in a rotational manner, which the cyclist must maneuver in order to thus carry out the various shifts of gears. Such devices have been described for example, in the French Patent Applications Nos. 2,620,104, 2,637,249 and 2,639,313.

These devices, although they have been improved, are not entirely satisfactory and have a certain number of disadvantages. Indeed, the gear shift devices that are currently on the market, as we are aware, have high manufacturing costs and are not totally reliable in use. In addition, they are relatively heavy and are not completely precise as regards the position of the chain in engagement. To solve the problem linked to the lack of precision in positioning, some manufacturers have provided an indexing system of the control lever. But in light of transmission by metallic cable, it is completely impractical to want to impose a well defined position to the mobile element of the gear shift, and it is generally the cyclist who intuitively places the control lever in the most appropriate position, and then refines the adjustment by using the noise that the chain makes when it is not quite in the correct position. As such, it is easy to understand that the cyclist is more preoccupied by shifting gears than by pedaling. Also, the cyclist must, in most cases, leave his handle bar to move the gear shifting lever, which, under the best of circumstances, can hardly be considered ideal, especially for competitive cyclists who ought only to have to concentrate on their pedaling and steering.

The present invention aims to solve these various disadvantages of prior art gear shift devices and suggests a new idea for a gear shift that provides greater indexing precision, ease of use, possibility of multiplying the controls by placing them at different areas and especially on the handle bar, better reliability, and less weight and cost. The device according to the invention also enables gear shifting with a minimum control energy.

SUMMARY OF THE INVENTION

Thus, according to the invention, the gear shifting device for bicycles having a chain and pinion transmission comprises a mobile gear shift assembly adapted to laterally displace the chain enabling passage from one gear to another and is characterized in that it comprises transformation means, transforming the rotation of one of the pivoting gears into a lateral displacement of the mobile gear shift assembly.

According to one of the characteristics, the transformation means are constituted by a ramp system, and according to a preferred embodiment, by a guide path or ramp, rotationally affixed to one of the gears adapted to cooperate with a control finger or with a transmission axis affixed to a transversely mobile control shaft, and comprising control teeth.

According to an additional characteristic, the gear shifting device comprises control means for the lateral displacement of the mobile gear shift assembly. In a preferred embodiment, these means comprise at least one control finger mobile between a retracted resting position and a projecting working position in which it is engaged against one of the control teeth and an electromagnet, adapted to be powered with current. The control finger is advantageously biased in the retracted resting position by a compression spring.

According to an improvement, the control device comprises a metallic plunger independent of the control finger which is made of a non-magnetic material, and the control means comprise an electrical supply circuit constituted by a battery and at least one interrupter controlling upshifting and at least one interrupter controlling downshifting.

According to another complementary characteristic, the gear shifting device comprises indexing means to define the position of the mobile gear shift assembly, the means being partially affixed to the upper retention assembly and partially affixed to the mobile gear shift assembly.

According to another characteristic, the gear shifting device is connected to the frame of the cycle and comprises an upper retention assembly on which a mobile gear shift assembly is movably mounted,. According to a preferred variation, the mobile gear shift assembly is located slidably along an axis concurrent with the general symmetrical plane of the cycle, or is located in a tipping manner on the upper retention assembly.

According to one of the embodiments, the gear shifting device is a rear gearshift and its mobile gear shift assembly comprises an upper pivoting return wheel and the control shaft is located slidably inside a main casing which slides in a hole of the upper retention assembly. The control shaft comprising a series of teeth for controlling upshifting and a series of teeth controlling downshifting, whereas control is ensured by two control devices: a first control device for upshifting and a second control device for downshifting, each device comprising an electromagnet powered during closure respectively of one of the interrupters for controlling upshifting or one of the interrupters for controlling downshifting.

According to another embodiment, the gear shifting device is adapted to displace the chain from one front plate to another and comprises a system of vertical ramps controlling the lateral displacement of the gear shift member.

BRIEF DESCRIPTION OF THE DRAWINGS

Other characteristics and advantages of the invention will become more apparent upon reading the description that follows with respect to the annexed drawings which are only provided as non-limiting examples.

FIGS. 1–26 represent a first embodiment according to which the gear shifting device is a rear gear shift.

FIG. 1 is a lateral view of a bicycle equipped with a device according to the invention.

FIG. 2 is a perspective view of the rear gear shift according to the invention.

FIG. 3 is a lateral view of the rear gear shift according to the invention.

FIG. 4 is a partial sectional view along IV—IV of FIG. 3.

FIGS. 5 and 6 are sectional views along V—V of FIG. 3 illustrating two different positions.

FIG. 7 is an exploded view of the details of the device according to the invention.

FIG. 8 is a schematic perspective view illustrating the transformation means.

FIG. 9 is a lateral view illustrating the guide path.

FIG. 10 is a view showing the guide path in a developped form.

FIG. 11 is a partial sectional view along XI—XI of FIG. 3.

FIG. 12 illustrates the control device in a retracted resting position.

FIG. 13 is a view illustrating the control device in its active position.

FIG. 14 is a schematic view showing the control and indexing electrical circuit.

FIG. 15 is a perspective view showing a detail of the embodiment.

FIG. 16 is a diagram illustrating the characteristics of the springs of the indexing device.

FIGS. 17, 18 and 19 are views illustrating, as diagrams, the different actions, respectively, of the control interrupters, solenoid, and indexing commutator. FIG. 17 shows the impulse provided by the control interrupter. FIG. 18 represents the supply of the corresponding solenoid, whereas FIG. 19 illustrates the action of the indexing commutator. The graphs being arranged to have the same time reference.

FIGS. 20 to 23 are views similar to FIGS. 5 and 6 showing different gear shift positions.

FIGS. 24, 25 and 26 are external rear views of the gear shifting device in the respective positions of FIGS. 20, 21, 22 and 23.

FIG. 27 is an external view similar to FIG. 24.

FIGS. 28 and 29 are schematic simplified views illustrating two embodiments.

FIGS. 30 to 33 represent an improvement.

FIG. 30 is a perspective view showing the improvement in its inactive position.

FIG. 31 is a partial sectional view of FIG. 30.

FIG. 32 is a view similar to FIG. 30 showing the improvement in the active position.

FIG. 33 is a partial sectional view along T1 of FIG. 32.

FIG. 34 is a schematic view in a transverse section.

FIG. 35 shows a disk cam seen along the rotational axis.

FIG. 36 represents a schematic view of another embodiment of the device as per the invention.

FIGS. 37 to 42 illustrate a variation of the embodiment of FIG. 36.

FIGS. 37 and 38 are partial sectional views of the device in two successive positions.

FIG. 39 is a view of one of the elements along its axis.

FIG. 40 is a section T1—T1 of FIG. 37.

FIG. 41 illustrates a detail.

FIG. 42 is a sectional view along T2—T2 of FIG. 37, illustrating other constructional details.

DETAILED DESCRIPTION OF THE PREFERRED EMBODIMENTS

Figure 1:
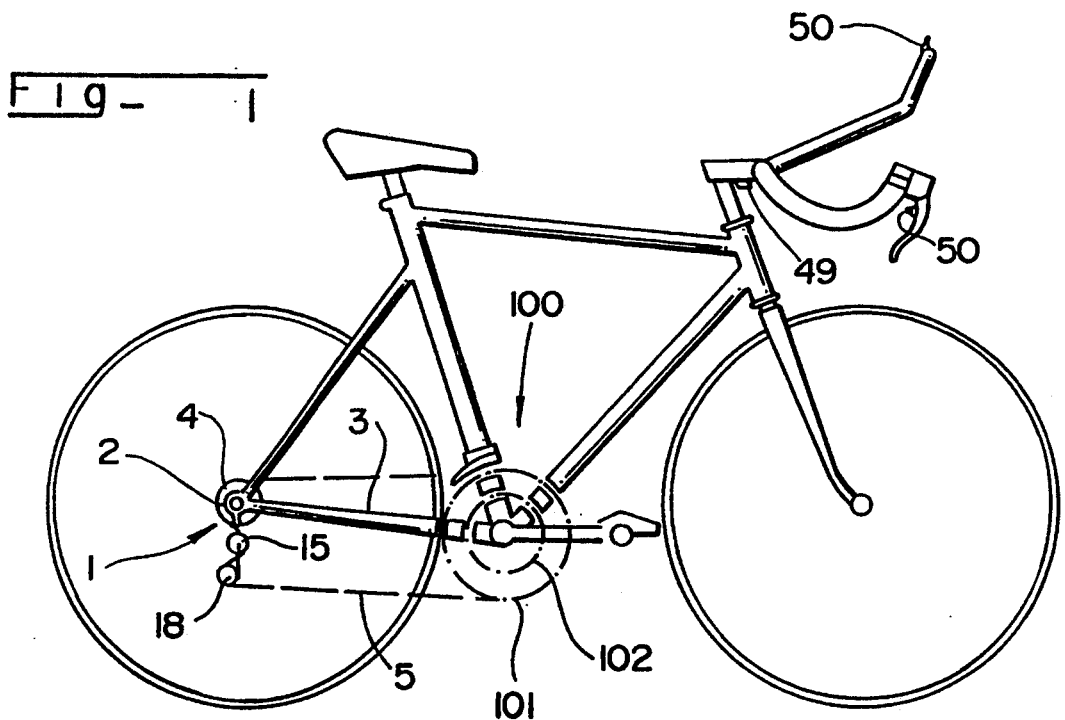
Figure 2:
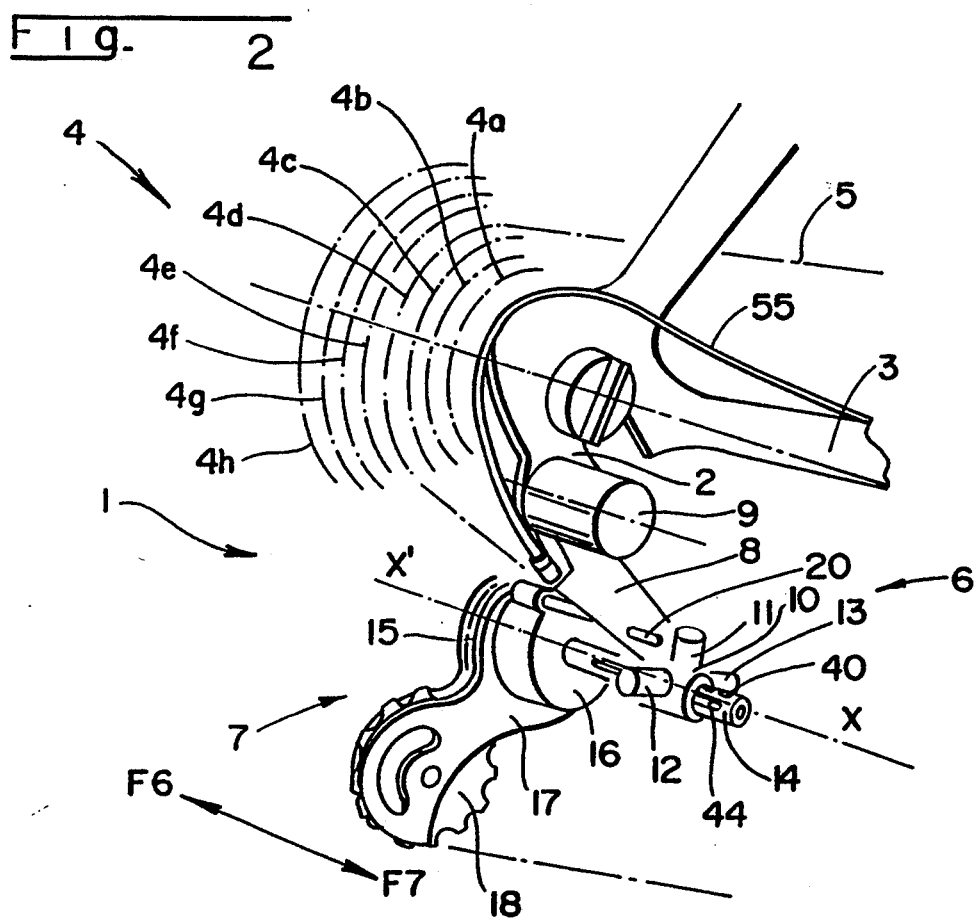
Figure 3:
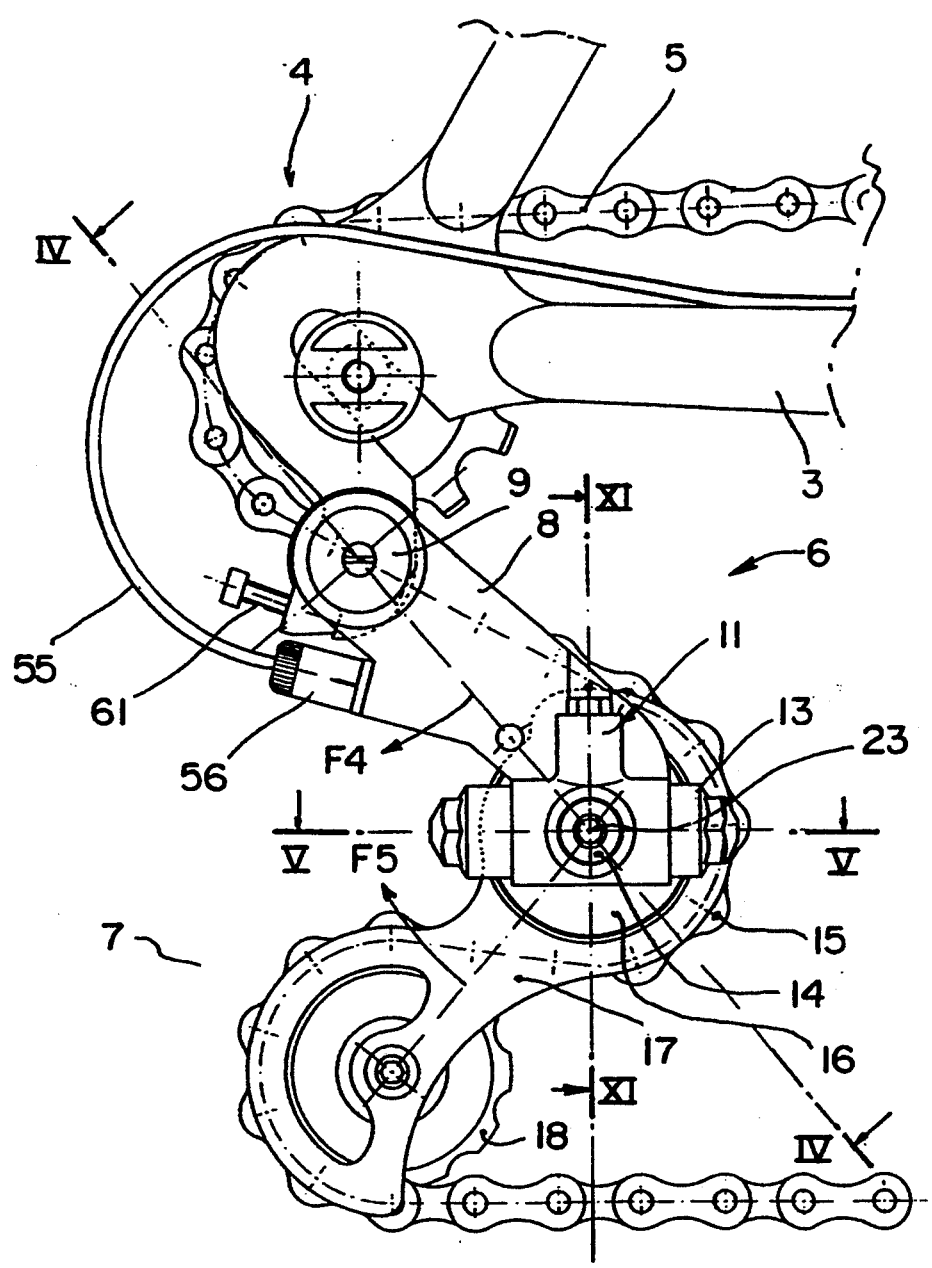
Figure 4:
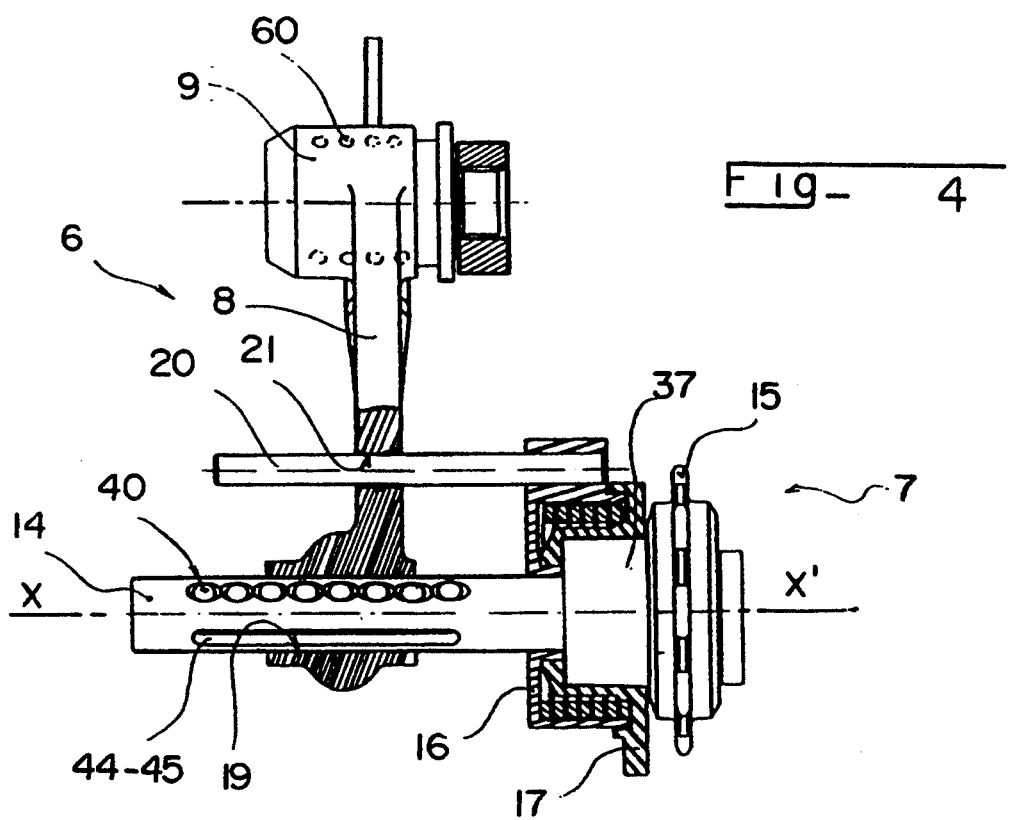

The first embodiment illustrated in FIGS. 1 to 26 is a gear shifting device of the type called "rear gear shift" enabling, by lateral displacement of the chain, the passage thereof from one gear to another, either in the upshifting direction by lateral displacement along F6, or in the downshifting direction by lateral displacement along F7. The cycle is of a known type and has a general symmetrical plane (P).

The gear shifting device according to the first embodiment, provided as an example, and bearing the general reference numeral (1) is, in a known manner, located in such a way as to be fixed on a hook (2) of frame (3) of the cycle. The fastening hook (2) is constituted by a lower extension of the fork on the side on which the series of demultiplier gears (4) is located. According to the embodiment, the series of gears (4) comprises for example eight gears (4a, 4b, 4c, 4d, 4e, 4f, 4g, 4h) which have, in a known manner, a diameter that becomes increasingly smaller externally (EX) so as to define the transmission ratios by selective cooperative with the chain.

The device according to the invention comprises, as we will see later in a more detailed manner in the description, transformation means of the movement (MT) transforming the rotational movement of a gear into a lateral displacement of a mobile gear shift assembly. Besides, it comprises control means (MC) enabling the triggering of the upshifting or downshifting, as well as indexing means (MI) providing the mobile gear shift assembly (7) with a well defined and precise position with respect to the various gears (4).

The rear gear shift (1) mainly comprises an upper retention assembly (6) on which a lower mobile gear shift assembly is retained in a mobile manner. The upper retention assembly (6) is constituted by an upper retention arm (8) whose upper end (9) is fixed on the fastening hook (2) affixed to the rear fork of the bicycle and whose lower end (10) comprises a control and indexing assembly constituted by an indexing device (11) and by two control devices (12, 13), one of the devices (13) controlling the upshifting, whereas the other (12) controls the downshifting.

The lower mobile assembly (7) is constituted by a main casing (14) having a general cylindrical shape of axis (XX') one of whose ends is free, whereas the other bears an upper return wheel (15), a secondary casing (16), and a connection arm (17) bearing at its lower portion, a lower return wheel (18). The upper wheel (15) is rotationally mounted on the main casing (14) by means of a ball bearing. The main casing (14) is, in addition, slidably mounted along its axis (XX') on the lower end (10) of retention arm (8) which comprises a lower guide hole (19), and its rotational blocking with respect to the upper retention assembly (6) is ensured by a secondary guide shaft (20) affixed to the secondary casing (16), located in parallel to axis (XX') and adapted to slide in a secondary guide hole (21) obtained in the upper retention arm (8). The lateral displacements of the gear shift assembly (7) are lateral translations along axis (XX') which is advantageously perpendicular to plane (P). The main sliding casing (14) comprises a central longitudinal hole (22) of axis (XX'), adapted to constitute a sliding housing for a control shaft (23) whose sliding movements in the housing are controlled by the rotation of the upper wheel (15), as we shall see later. The control shaft (23) comprises a first series (25) of teeth for controlling upshifting and a second series (24) of teeth for controlling downshifting. The number of teeth being naturally defined in accordance with the number of gears. Each of the control teeth is constituted, on the one hand, by a wall perpendicular to axis (XX') and on the other hand, by a wall inclined with respect to the axis (XX'), so as to constitute between two adjacent teeth, a hollow section in which the corresponding control finger can be placed in an active control position. Thus, and as is clear in FIG. 5, the series (25) of control teeth for upshifting is such that each hollow section is limited by an internal (IN) perpendicular wall (250) and an external (EX) inclined ramp (251) and the series (24) of control teeth for downshifting is such that each hollow section is limited by an external (EX) perpendicular wall (240) and an internal (IN) inclined ramp (241).

Besides, the end (26) of the control shaft (23) located on the side of secondary casing (16) comprises a transmission axis (27) which is affixed to it and is located perpendicularly to axis (XX'). This transmission axis (27) enables, on the one hand, the rotation of the control shaft to be immobilized on itself, and at the same time enables its alternative sliding along F1 and F2. To this end, the transmission axis (27) is guided by two longitudinal slots (28, 29) located diametrically on the peripheral wall of the main casing (14). Besides, one of the ends of transmission axis (27) projects with respect to the external peripheral surface (30) of casing (14) and cooperates with a guide path (31) rotationally affixed to upper wheel (15). The guide path (31) is limited laterally by two parallel guide ramps, distanced from one another by a distance which is equal to the diameter of the transmission axis, leaving only a functional clearance. The guide path (31) is peripheral and sinuous, and is constituted by an upshifting ramp (32) obtained by the peripheral wall of a first ring (33) and a downshifting ramp (34) obtained in the peripheral wall of a second ring (35). FIG. 10 represents a developed view of the peripheral surfaces of the two rings particularly showing the guide path and its sinuous shape. Naturally, this guide path can have other shapes, such as represented in dotted and dashed lines. The two ramps being parallel with respect to each other and their distancing being ensured by an intermediate ring (36) comprising two indexing and drive projections (37, 38). The first ring (33), the second ring (35) as well as the intermediate driving ring (36) forming an assembly affixed rotationally to the upper wheel (15) housed inside a tubular extension (37) thereof.

The end of the main casing, opposite to the side on which the upper wheel is located, comprises on the one hand, on its upper generatrix, a series of indexing hollows (40a, 40b, 40c, 40d, 40e, 40f, 40g, 40h) adapted to receive a ball (41) of indexing device (11), biased downwardly by a compression spring (42) thus constituting the indexing means (MI). Besides, the peripheral wall (43) of the main casing (14) comprises two longitudinal slots (44, 45) located diametrically and enabling passage of control fingers (46) of the control devices (12, 13).

The indexing hollows (40a, 40b, 40c, 40d, 40e, 40f, 40g, 40h) are constituted by cylindrical radial holes obtained in the peripheral wall (43) of the main casing (14). The number of indexing hollows corresponds to the number of gears that rear wheel of the cycle comprises, and the respective distance "d" is substantially equal to the distance "d" separating the planes of two adjacent gears. Similarly, their position is a function of the position that upper wheel (15) must have with respect to the various gears.

Figure 12:
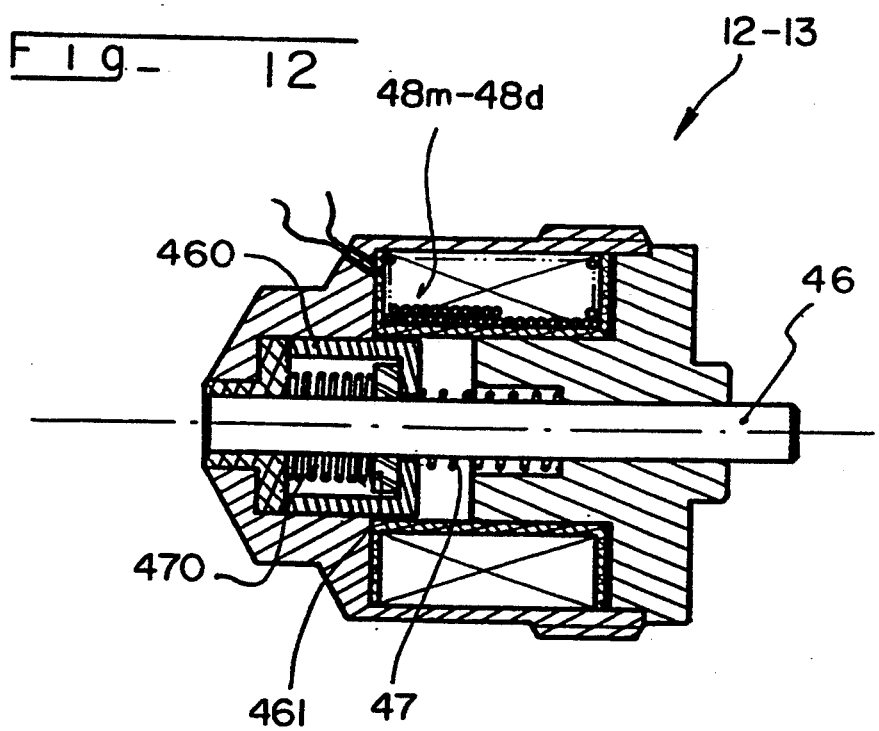
Figure 13:
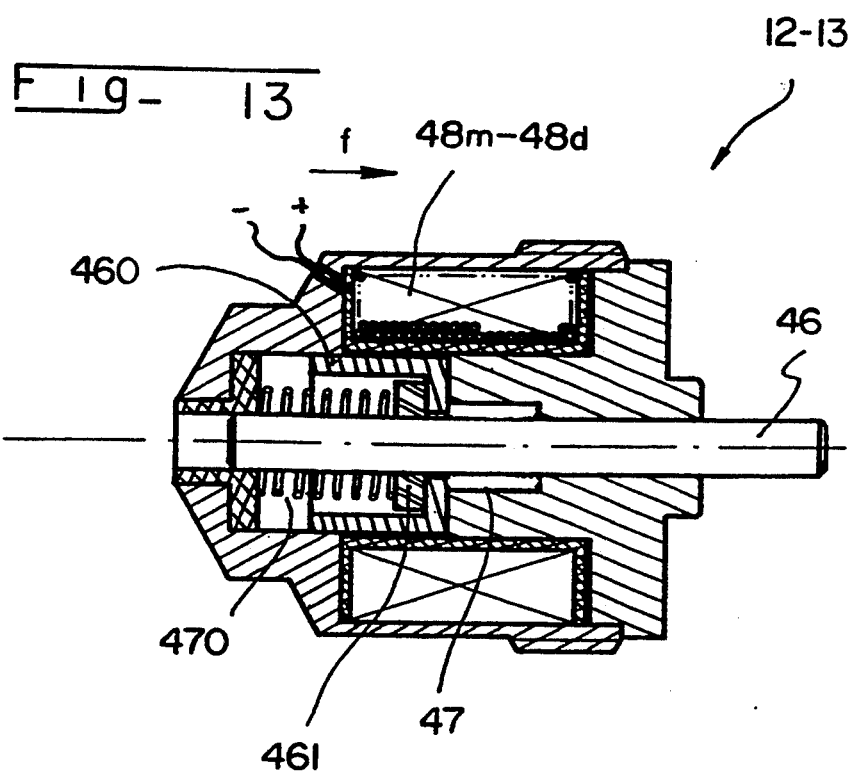

The control means (MC) are constituted by two control devices, a first device (12) or control device for downshifting and a second device (13) or control device for upshifting. Each of the control devices (FIGS. 12, 13) comprises a control finger (46) constituted by a cylindrical non-magnetic shaft, translationally mobile along its axis between two positions: a retracted resting position and a projecting active position in which it is engaged in one of the hollow sections of the control shaft. Each device comprises, in addition, two compression springs: a first spring (47) adapted to retain finger (46) as well as the independent mobile tubular plunger (460) in their retracted position, and a second spring (470) having less power, whose function will be described later. Moreover, each of the devices comprises an electromagnet (48m–48d) which, when it is powered with electrical current, is adapted to create an electromotive force bringing about the displacement along "f" of the independent mobile tubular plunger (460). In the resting position, the plunger is biased by spring (47) in support against a ring (461) affixed to finger (46) as can be seen in FIG. 12.

Figure 16:
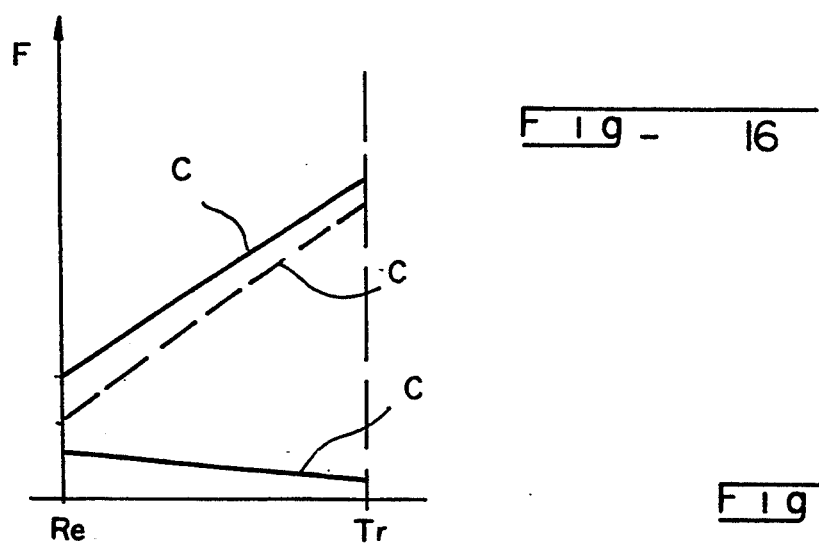
Figure 17:
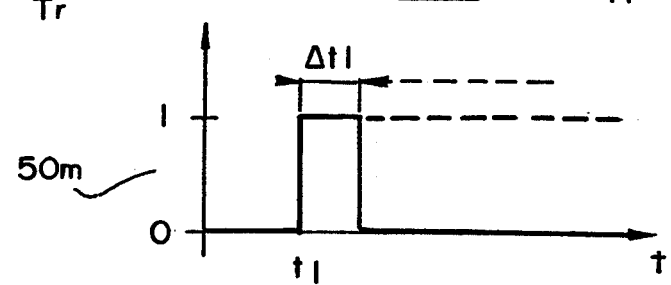

FIG. 16 is a diagram illustrating the characteristics of the two springs (47, 470). The curve (C2) representing the variations of the forces of spring (47) from its resting position (Re) to its working position (Tr), whereas curve (C1) represents the variations of the forces of spring (470) in the same conditions. Curve (C3) is a curve illustrating the difference in force between spring (47) and spring (470).

Figure 11:
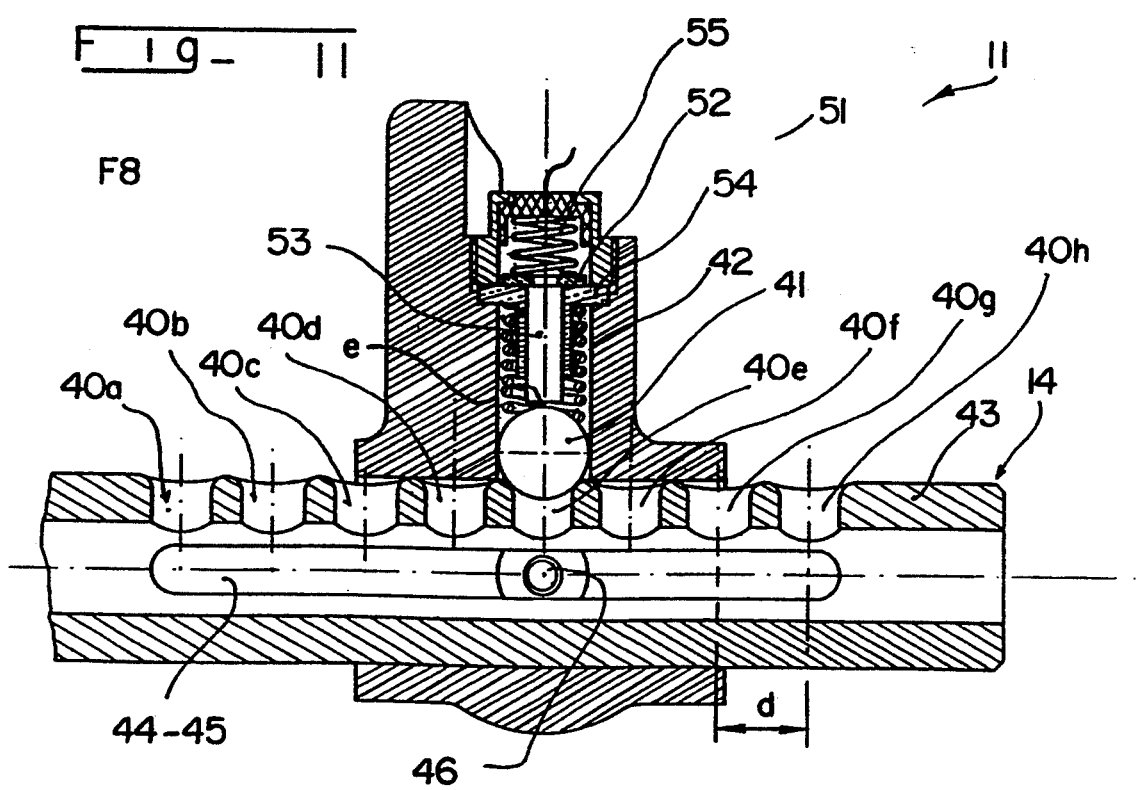
Figure 14:
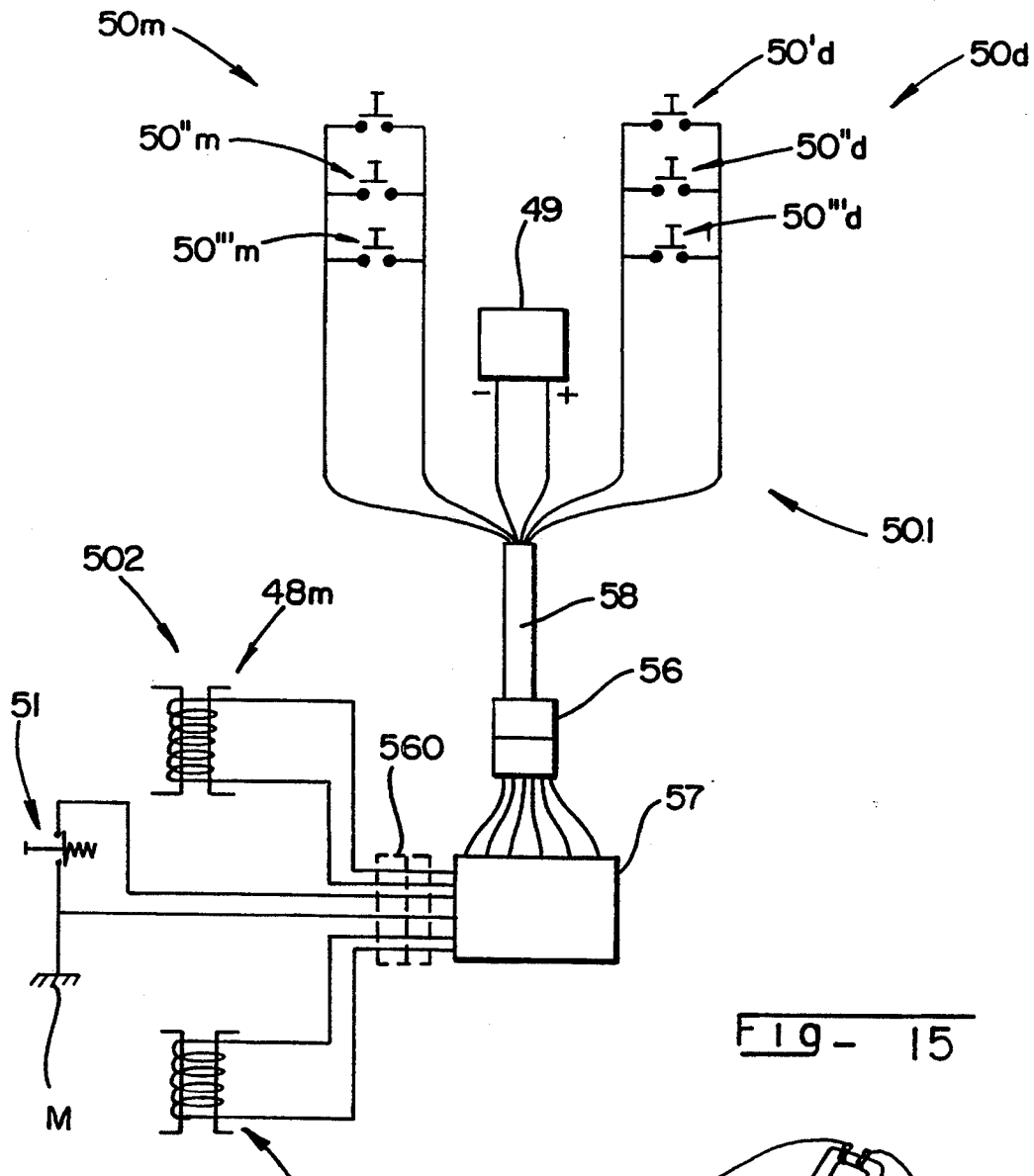
Figure 15:
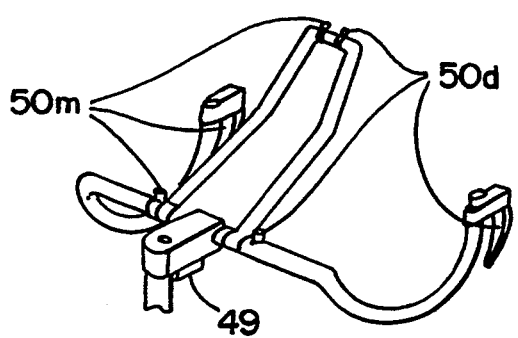

FIG. 14 illustrates, in a schematic manner and as an example, an electrical circuit which comprises a continuous current generator, such as electrical batteries (49), enabling the entirety of the circuit to be powered with electrical current, and especially the electromagnet (48m) of the upshifting device or the electromagnet (48d) of the downshifting device, when one or the other of the corresponding circuits is powered. Besides, the circuit comprises one or several interrupters (50m) for upshifting and one or several interrupters (50d) for downshifting. Each interrupter is, for example, of the push-button type and if the device comprises several interrupters, as illustrated in FIG. 11, these are connected in parallel, so as to supply the corresponding electromagnet by the action of the cyclist on any one of the interrupters. In addition, one can advantageously place all the interrupters for downshifting on the right side of the cycle and all the interrupters for upshifting on the left side of the cycle, and, for example, place an interrupter for downshifting (50'd) beneath the front brake handle, and an interrupter for upshifting (50'm) beneath the rear brake handle. Naturally, it is possible to place these interrupters at any desired spot area, as is represented in FIG. 15, where interrupters are located on the front central portion of the handle bar and on the median central portion.

Figure 18:
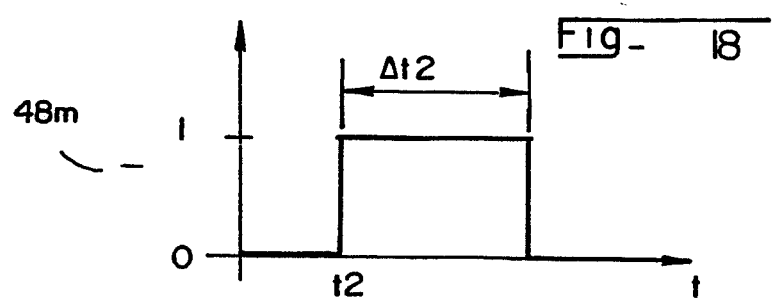
Figure 19:
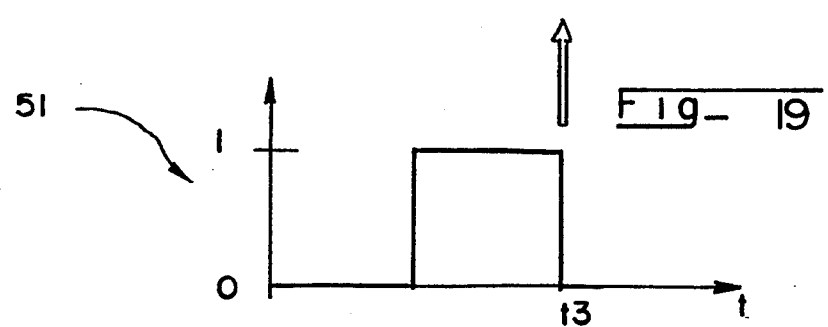

Besides, the electrical circuit is completed by an complementary contactor (51) located in the indexing device (11), more specifically represented in FIG. 11. This complementary contactor (51) is closed in the resting position and placed at mass (M). It is constituted by a metallic washer (52) affixed to a sensor rod (53) made of an electrically insulated material, for example, a plastic material, and biased by a spring (55) in support on another metallic support washer (54) connected to the mass. One will note, as can be seen in FIG. 11, that in the resting position, the sensor rod (53) is not in contact with ball (41). Thus, to ensure mechanical and electrical contacts, a clearance "e" is provided between the rod (53) and ball (41). The electrical circuit comprises two sub-assemblies: one supply sub-assembly (501) and one action sub-assembly (502), the connection of one of the sub-assemblies to the other being done by the electrical cable (58) and an electrical connector (56) which can also be located as is represented in dotted and dashed lines by reference (560). An electrical circuit for processing electrical signals (57) is also provided which can be obtained in multiple fashions and comprises for example a microprocessor. The functioning of the electrical circuit illustrated by diagrams 17, 18, 19 is as follows: the cyclist who wishes, for example, to upshift, activates at a moment "t1", one of control interrupters (50m), by providing an impulse that will last "Δt1" (see FIG. 17). The electromagnet (48m) then being powered at moment "t2" substantially equal to "t1" (FIG. 18), will cause the displacement along "f" of corresponding plunger (460m), and this, against the action of the first spring (47). The control finger (46m) is then freed and is engaged in a corresponding hollow, biased along "f" by the second spring (470). According to a preferred arrangement, the electromagnet (48m) remains powered during a time "Δt2" by virtue of a special arrangement of the electronic circuit (57). The mobile gear shift assembly (7) is then displaced. During this displacement, ball (41) of the indexing device biased in recess, pushes back the sensor rod (53) causing the opening of the complementary contactor (51) and closes at moment "t3" as soon as the indexing ball (41) has found the next indexing hollow (FIG. 19) controlling or bringing about the end of the electromagnetic (48m) excitation (FIG. 18).

The rotation of the upper wheel (15) driven by chain (5) brings about the rotation along (R) about axis (XX') of the guide assembly constituted by the first ring (33), the intermediate ring (36) and the second ring (35). Thus, by cooperation of the drive axis (27) and of guide path (31) and more specifically of the walls forming the guide ramp, the rotational movement (R) of the upper wheel will be transformed into an alternative translational movement in either direction, along alternatively F1 and F2 of the control shaft. Thus, at each rotation of the wheel (15), the control shaft will be displaced along its axis from an extreme left position to an extreme right position and vice versa, and this, while crossing a distance (d1) advantageously slightly greater than distance (d) separating each indexing hollow.

Figure 5:
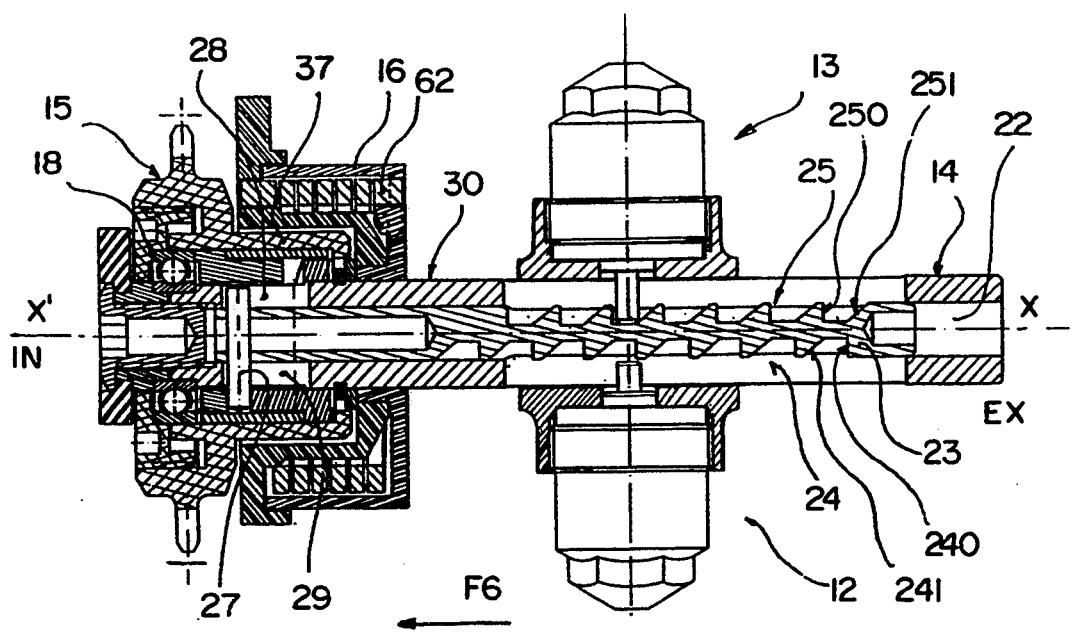
Figure 6:
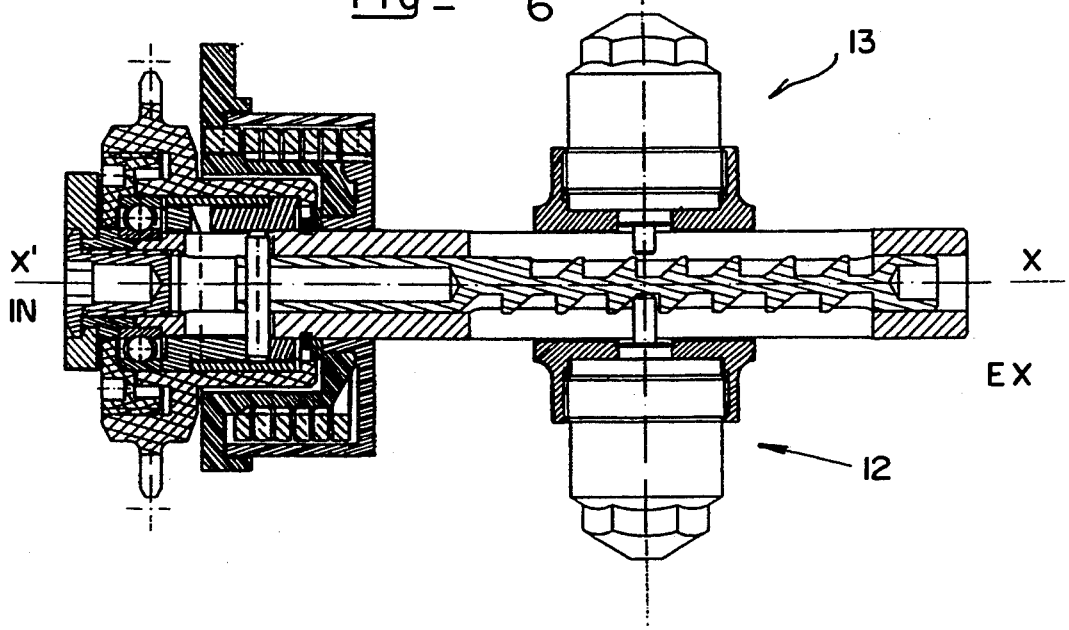

Passage from one gear to the other is done by virtue of shutting one of the interrupters. Thus, if the cyclist wants to upshift, he can power the electromagnet (48) of the downshifting control device (13) simply by shutting one of the interrupters controlling upshifting (50m) thus bringing about, as has already been explained, displacement of control finger (46) which will be in engagement with the corresponding tooth of the series of teeth (25) of the upshifting control device. FIG. 5 illustrates such a situation. In light of the alternative translation along F1, F2, the control finger will pass from one tooth to another, thus bringing about the lateral displacement along F6 of the mobile gear shift assembly towards the general symmetrical plane (P) of the cycle.

Figure 24:
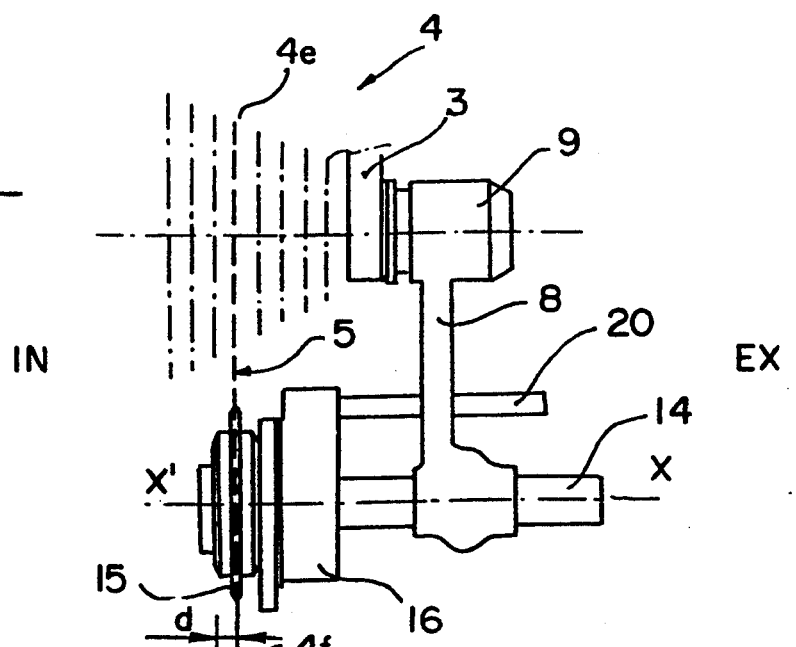
Figure 25:
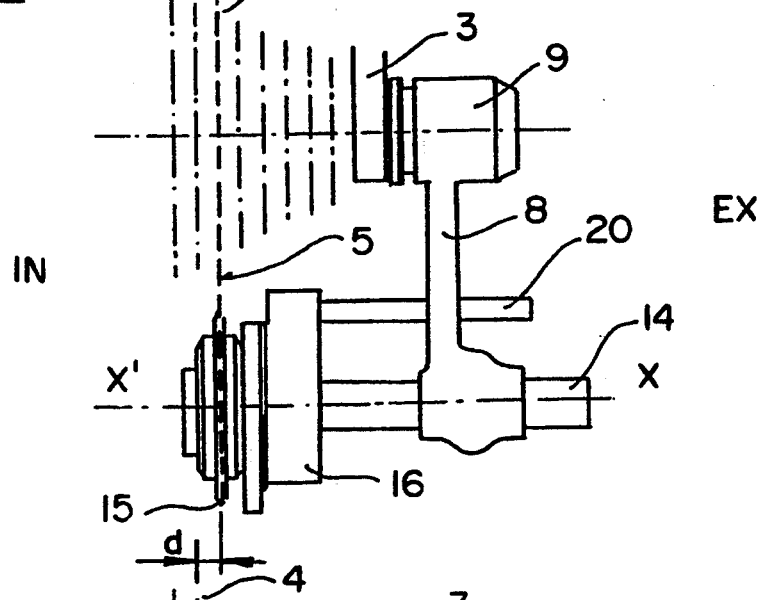
Figure 26:
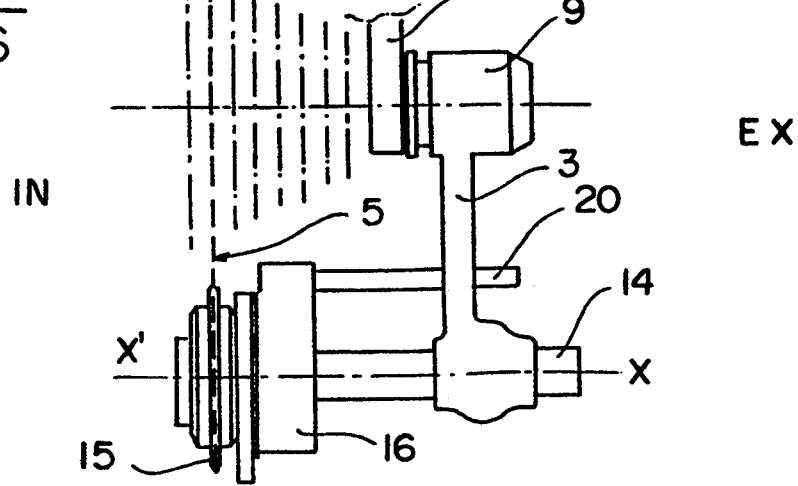

FIGS. 20 to 26 illustrate the gear shifting device in two successive upshifting positions. In the positions of FIGS. 20 and 24, chain (5) is in engagement with one of the intermediate gears (4e) and the control finger (46) is engaged in the hollow section (25d). The sliding along F2 of control shaft (23) by its support on control finger (46), causes the inward (IN) displacement along F6, of the mobile gear shift assembly, from a distance "d" corresponding to the distance between two gears (4e) and (4f) thus bringing about the derailing of chain (5) and its engagement on the next gear (4f), the indexing ball (41) then being engaged in the indexing hollow (40f) providing a defined position to the gear shift assembly. If the upshifting interrupter (50m) is maintained closed, the control finger is still biased in an active position and will be engaged in the next adjacent hollow (25e) and the mobile gear shift assembly will once again be displaced inwardly (IN) by a distance "d" to once again derail the chain and place it in engagement with the next gear (4g), the indexing ball (41) then being engaged in the indexing hollow (40g). The cyclist can thus, by using the upshifting interrupter, pass successively from one gear to the other. Downshifting is done by a similar process, but by closing one of the downshifting interrupters.

It is understood that the gear shifting device illustrated in FIGS. 1 to 26 also constitutes a return and tension device for the chain, and the mobile gear shift assembly (7) as well as the upper retention assembly (6) are each biased by an elastic device. Thus, the upper retention assembly (6) comprises, on the one hand, an elastic return system (60) rotationally biasing the entirety of the device towards the rear (AR), along F4, and on the other hand, an abutment system (61) limiting the pivoting path of the assembly. Besides, the connection arm (17) is journalled in the secondary casing to pivot along axis (XX') and is biased rearwardly (AR) along F5 by a second elastic system (62).

It is understood that the transverse displacement of the mobile gear shift assembly can be of any type, that is, a translation, as represented in FIGS. 1-26, or a pivoting or tipping displacement, as illustrated in the embodiment of FIG. 36. In the embodiments illustrated in FIGS. 1-26, the translation of the mobile gear shift assembly occurs along an axis (XX') perpendicular to the general symmetrical plane (P) of the cycle, but actually, one would not be leaving the scope of the invention if such axis, while being concurrent with plane (P), were inclined either downwardly, or upwardly or frontwardly, or rearwardly, or along a combined inclination, for example downwardly and rearwardly, or downwardly and frontwardly or another type of combination.

Figure 27:
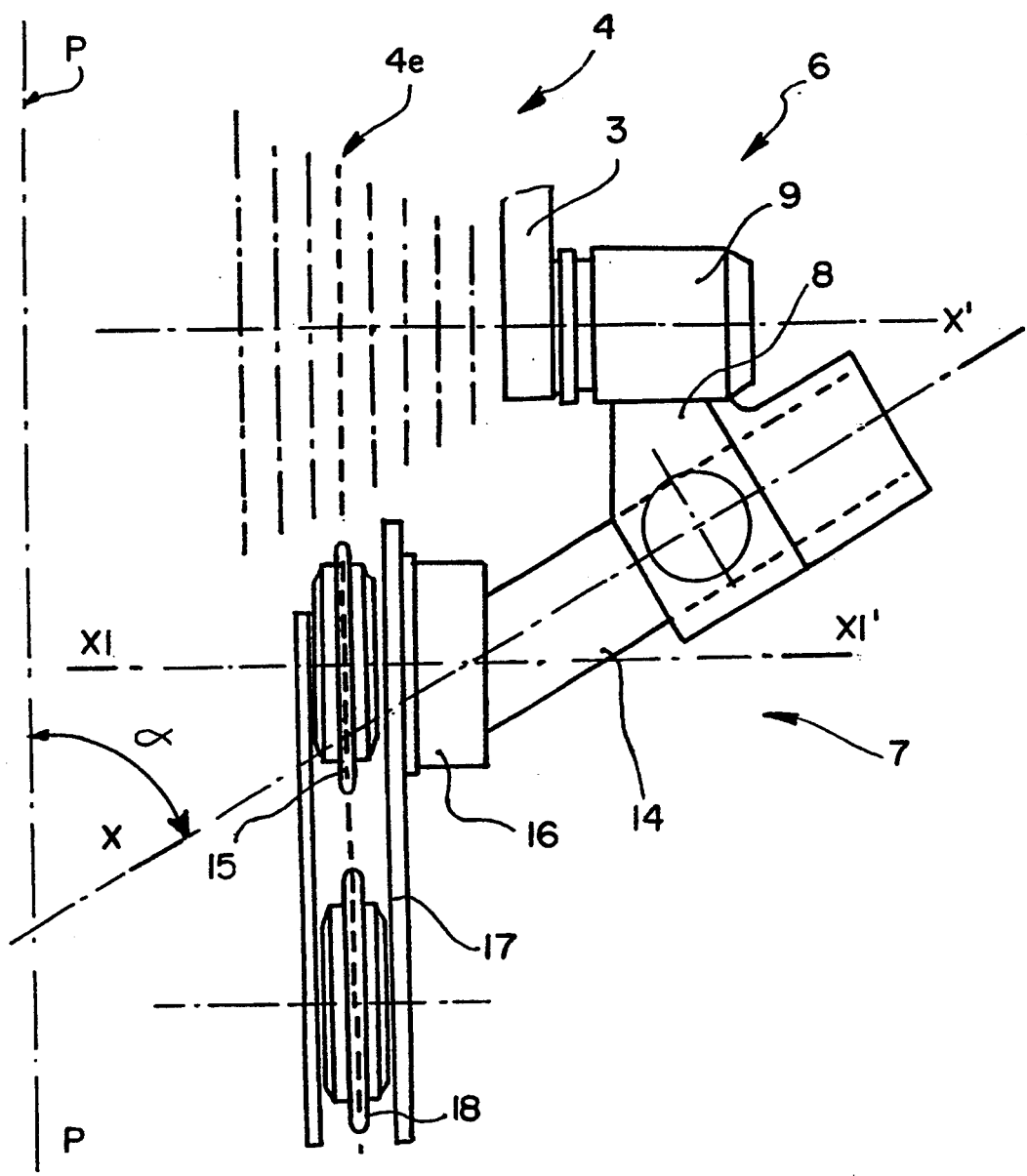
FIGS. 27 to 29 illustrate a variation of the embodiment.
Figure 28:
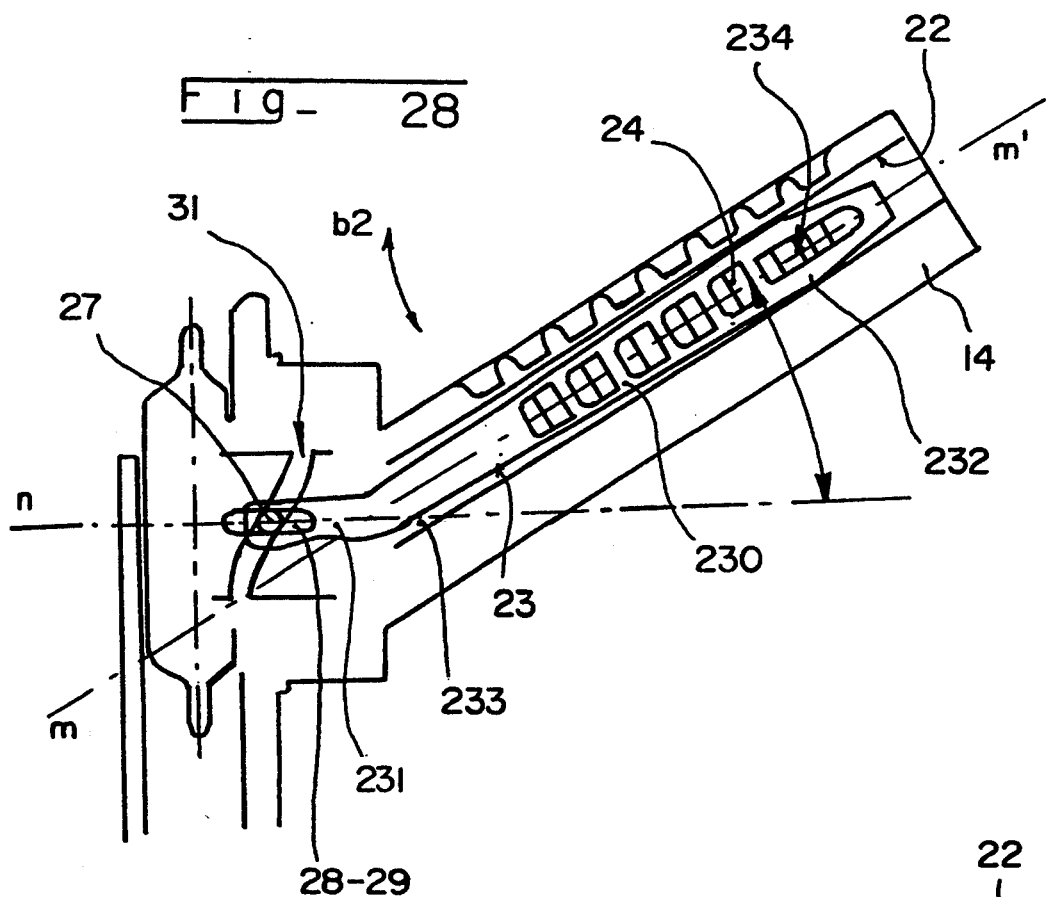
Figure 29:
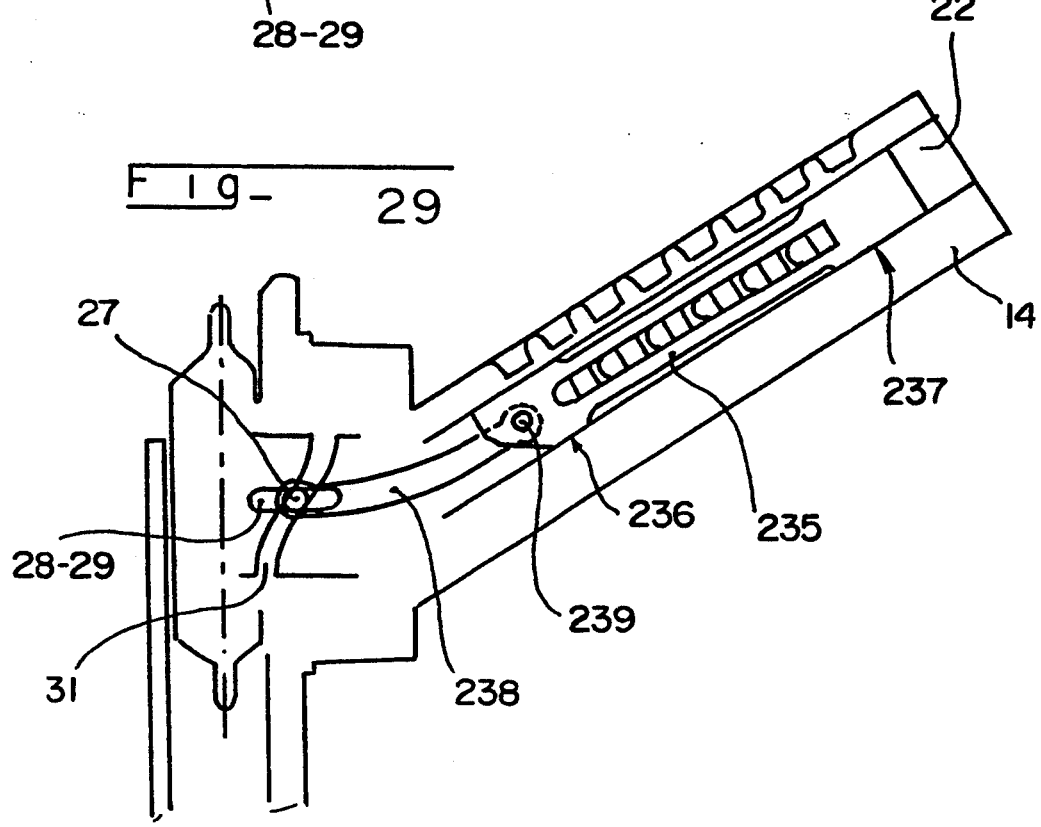

FIGS. 27-29 illustrate a variation of the embodiment of a rear gear shift, according to which the displacement of the mobile gear shift assembly (7) occurs along a lateral translation, in a direction (XX') inclined with respect to the general symmetrical plane (P) of the cycle, by an angle (α) comprised between 40° and 90°, and for example, approximately 60°. For a better understanding of this variation, elements that are at least functionally similar, have the same reference numerals as the embodiment illustrated in FIGS. 1-26, and reference should therefore be made to the corresponding description for everything that has not specifically been described hereinafter.

As previously, the gear shift comprises a lower gear shift assembly (7) which is mobile in lateral translation along an upper retention assembly (6). The lower mobile assembly (7) is, as previously, constituted by a main casing (14) one of whose ends bears the upper return wheel (15), the secondary casing (16) and connection arm (17) bearing at its lower portion, the lower return wheel (18). The main casing (14) is, in addition, slidably mounted along its axis (XX') on the end of the retention arm (8) which comprises a lower guide hole (19). In this variation, the main casing (14) has a rectangular section, which, by cooperation with the corresponding guide hole (19), enables its rotational blocking, and at the same time enables it to slide along its axis (XX'). The upper return wheel (15) is pivotably mounted in the secondary casing (16) about an axis (X1,X1') perpendicular to the general symmetrical plane (P). The two axes (XX') and (X1,X1') are concurrent to form an angle ($\alpha$) which, in the variation illustrated, is approximately 60°. It must also be noted that the main casing (14) comprises a central longitudinal sliding hole (22) for the control shaft (23) whose sliding movements in the hole are controlled by the rotation of the upper return wheel. Naturally, the secondary casing (16) comprises the same elements as in the embodiment described previously, and one can especially find therein guide path (31) with its upshifting and downshifting ramps. Also found therein are two longitudinal guide slots (28,29) for the transmission axis (27) of control shaft (23).

FIG. 28 schematically illustrates a first embodiment of the variation, according to which the control shaft (23) comprises a main side (230) whose lower end is extended by a secondary side (231) bearing the transmission axis. Said main side (230) laterally bears the two series of teeth (24,25) having a general axis (m,m') concurrent with axis (n,n') of secondary side (231). The axis (m,m') forms, along with axis (n,n'), an angle which is substantially equal to angle ($\alpha$) formed by axis (XX') and axis (X1,X1'). It must be noted that the main side section is variable and narrows progressively while approaching its junction zone with the secondary side, the wide upper end (232) constituting a guide zone for the shaft in cooperation with the sliding housing (22) of the main casing (14). The housing has a constant section, thus enabling the creation, in its lower portion, of a lower space (233) enabling the rocking (along b1,b2) of the control shaft with respect to its pivot point (234).

FIG. 29 is a view similar to FIG. 37 illustrating another embodiment, according to which the control shaft (23) comprises a main side (235) comprising two series of teeth (24,25) and which is translationally guided along its axis, in the sliding housing (22) of the main casing (14) by its two ends (236,237). According to this embodiment, the transmission axis (27) is affixed to the end of a mobile intermediate arm (238) whose other end is journalled on the lower end (236) of the main side (235) about an axis (239). It must be noted, in addition, that the body of the intermediate pivoting mobile arm (238) has a generally curved shape.

FIGS. 30 to 33 illustrate an improvement of the control shaft (23) whose series of teeth (25) adapted to upshifting comprises an additional detachable tooth, if an additional gear is mounted on the hub of the gear. Thus, the series of teeth (24) for downshifting comprises 7 teeth, whereas the series of teeth (25) comprises 6 fixed teeth and one additional tooth which can be added or eliminated. To this end, the upper end (237) of the control rod comprises a mobile element (240) which pivots about axis (m,m') to take an active position (FIGS. 32 and 33) and an inactive position (FIGS. 30 and 31). Said mobile element mounted on a screw (241) and constituted by a sector, comprises on its lateral wall, a planar blocking portion (242) and a hollow portion (243) enabling the formation of the additional tooth (25S). In the inactive position, the planar blocking portion (242) is in alignment with the series of teeth (25) whereas in the active position, it is the hollow portion (243) which is in such position. Advantageously, screw (241) comprises a split head (244) and an end (245) forming a pivot axis by cooperating with the control shaft which comprises, in addition, a recess receiving the mobile element (240). It must be noted that an indexing system enables both positions of the mobile element to be stable. The indexing system is constituted by a hollow (247) obtained on the mobile element adapted to cooperate with a corresponding projection (248) of the control shaft. It must also be noted that a spring (249) is adapted to maintain the cooperation, and that passage from one position to the other occurs by pivoting of the screw (241) which comprises an intermediate portion (250) in mesh with the mobile element.

Figure 34:
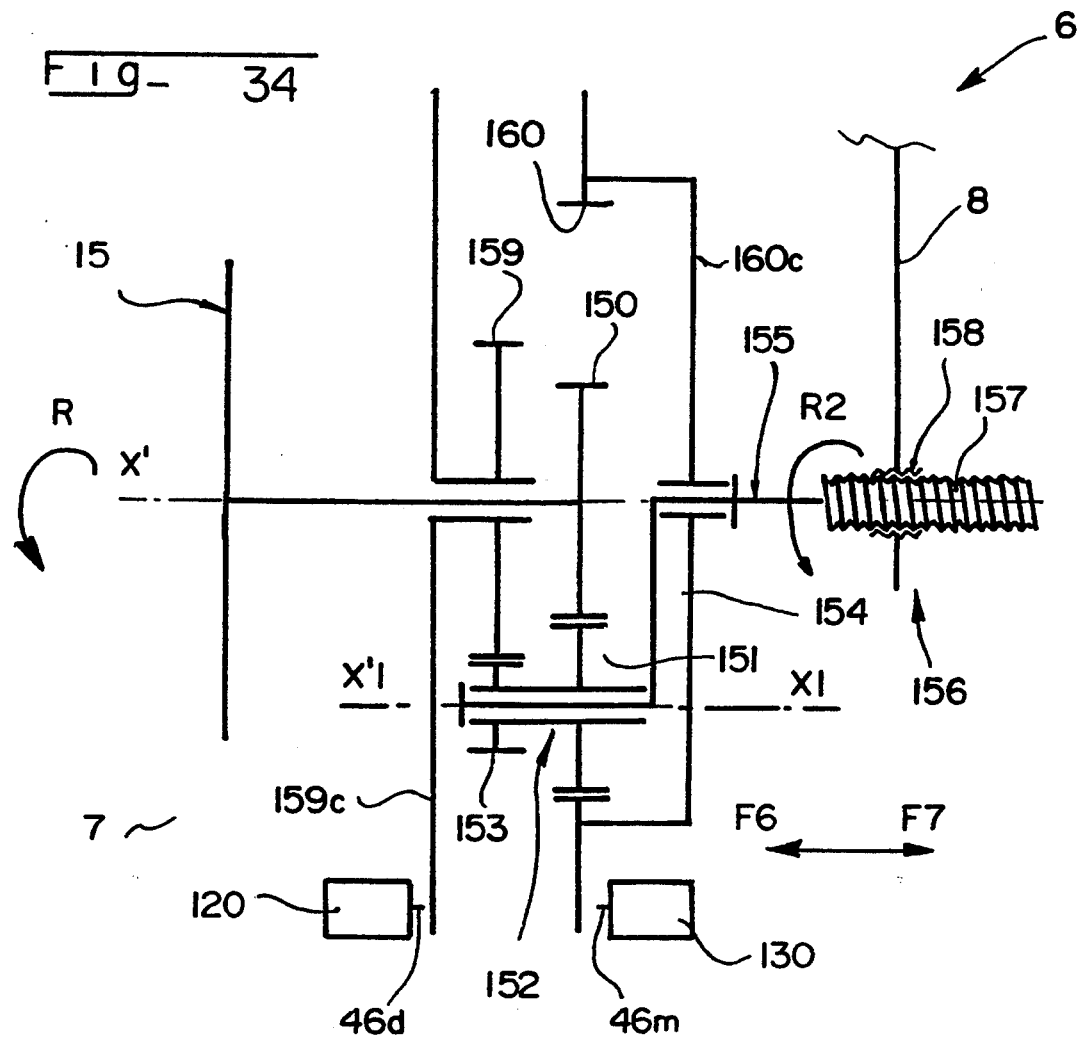
FIGS. 34 and 35 illustrate a variation of the embodiment.
Figure 35:
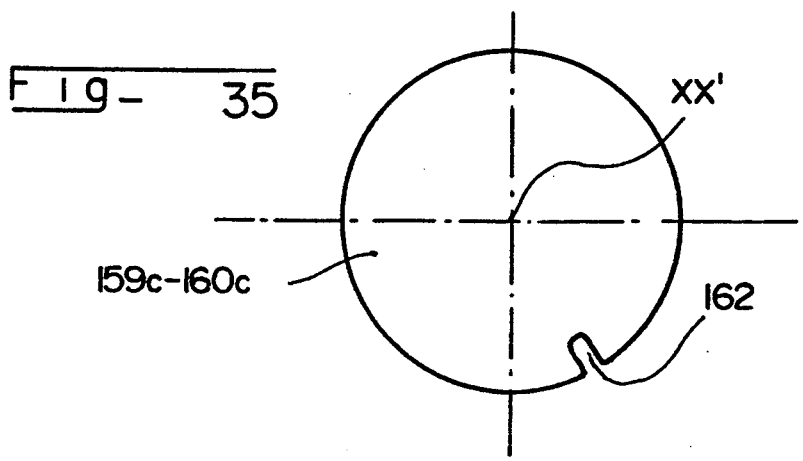

Another embodiment is illustrated in FIGS. 34 and 35. According to this variation, the transformation means (MT) are constituted by an assembly of gears cooperating with one another. According to this arrangement, the return wheel (15) is affixed to a first gear (150) which cooperates with one of the gears (151) of a carrier pinion (152) comprising another gear (153). Said carrier pinion being pivotal about an axis (X1X'1) affixed to a spider gear (154), kept pivoting, in addition about an axis (155) aligned on axis (XX'). On the other hand, end (156) of said axis (155) comprises a threaded portion (157) engaged in a threaded hole (158) affixed to the retention arm (8) of retention assembly (6). Moreover, the mobile assembly (7) comprises a first mesh (159) and an internally serrated crown (160), each respectively affixed to a disk cam (159c–160c). The outer mesh (159) meshing with gear (153) of the carrier pinion whereas the inner mesh (160) meshes with the other gear (151) of said carrier pinion. The assembly comprises control means of the type described hereinabove and constituted by a device for controlling downshifting (120) and a device for controlling upshifting (130). Each of the disk cams comprising a blocking notch (162) in which the control finger of the control device must be engaged in its projecting control position.

It is easy to understand that if the control finger of the downshifting device blocks the rotation of disc (160C), axis (155) will pivot in the same direction, thus bringing about the displacement along F7 of the mobile gear shift assembly (7) with respect to retention arm (8). Similarly, if the control finger of the upshifting device blocks the rotation of disc (159), axis (155) will pivot in the inverse direction, thus causing the displacement along F6 of the mobile gear shift assembly (7). This will ensure both upshifting and downshifting.

It is understood that the gear shifting device as per the invention is not limited to its application in rear gear shift devices. Indeed, the device according the invention finds an application in any type of gear shifting and, for example, can be used in a device for changing plates or front gear shift devices, such as shown by the general reference numeral (100) in FIGS. 1 and 36. In a known manner, the front transmission device comprises, for example, two plates or gears (101) and (102) of different diameters, the bigger plate being located externally (EX), whereas the smaller is located on the internal side (IN). The front gear shift (100) comprises, as described previously, an upper retention assembly (600) on which is movably mounted a mobile lower gear shift assembly (700) constituted by two connection rods (701–702) journalled pivotably on the retention assembly by their upper end, whereas their lower end comprises, on the one hand, a control device (103) and a gear shift member (104). The gear shift assembly being retained in a stable position by virtue of an elastic system (105).

The transformation means are constituted by a guide ramp (310) which is peripheral and sinuous and obtained on the peripheral wall of a ring (106) affixed to plate (102). The gear shift member (104) in itself is of a known type and comprises two flanks (104i, 104e) between which chain (5) circulates. It is understood that the activation of control device (103) will enable engagement of the control finger (46) in the guide ramp (310), causing the lateral displacement along F6 or F7 of the gear shift member (104) thus enabling shifting of gears.

FIGS. 37–42 illustrate a variation of the embodiment of FIG. 36. In order to understand the drawings, similar elements have the same reference numerals. Thus, the front transmission device comprises two plates (101) and (102) having different diameters, the bigger plate being located externally (EX), whereas the smaller is located on the internal side (IN). The front gear shift (100) comprises an upper retention assembly (600) on which is movably mounted a lower mobile gear shift assembly (700) constituted by two journalled connection rods (701–702) which pivot on the retention assembly by their upper end, whereas their lower end comprises, on the one hand, a control assembly (103′) and a gear shift member (104). Said gear shift assembly being advantageously retained in a stable position by virtue of an elastic system (105).

The control assembly (103′) is located vertically and slidably in a slide or sliding housing (110) affixed to the upper retention assembly (600) and comprises an upper connection rod (111) connecting the lower portion of the connection rod (701) to a slide (112) bearing the control device (103). The transformation means are constituted by a guide ramp (310) obtained in the wall of a vertical disk (113) affixed to plates (101, 102). The guide ramp (310) is formed by a groove limited by at least one internal upshifting cam (310′m, 310″m) and at least one external downshifting cam (310′d, 310″d). Advantageously, disk (113) comprises two internal cams for upshifting and two external cams for downshifting. As can be seen in FIG. 39, the upshifting cams are formed by a curve, each of whose points is increasingly distanced from the center, whereas the downshifting cams are formed by a curve, each of whose points is decreasingly distanced from said center.

The gear shift element (104) comprises two flanks (104i, 104e) between which chain (5) circulates. It is understood that the activation of control device (103) will enable engagement of control finger (46) in guide ramp (310), thus causing the vertical downward or upward displacement of slide (112). Thus, for example, the downward displacement along "V1" of the slide will enable passage from the position represented in FIG. 37 to the position represented in FIG. 38. The stable position of FIG. 38 will be maintained by the action of the elastic system (105). The indexing device defining the two positions being adjustable and constituted for example, by two screws (114, 115) acting as abutment.

Advantageously, the electrical circuit comprises a powering device and an end of path sensor device (116) constituted by a plate (117) affixed to the retention assembly and located in the sliding housing (110) and three connection plugs (121, 122, 127) affixed to the slide (112) and biased against said plate (117) by springs (123, 124, 128). Plate (117) comprises three tracks: a left track (118) for the plate to come down, a central track (119) or common correction track, a right track (120) for the plate to go up. The central track (119) is connected to one of the terminals of the electromagnet (103), whereas the two left and right plugs are, on the one hand, connected electrically with one another by connection (125), and on the other hand, to the other terminal of said electromagnet. In the position represented in FIG. 37, plug (121) is in contact with track (118) whereas plug (122) is not in contact with the corresponding track. If the electrical circuit for downshifting is shut for powering, the electromagnet (103) is powered causing the engagement of control finger (46) in guide path (310). The slide will then be displaced downwardly along "V1" by the action of one of the downshifting ramps (310′d, 310″d). In the lower position of the slide, plug (121) leaves the left track (118) and since the electromagnet is no longer powered, the control finger (46) will return to its retracted position. As has already been specified, the downward displacement of the slide will cause rotation along "R4" and the mobile gear shift assembly and the device will pass from the position illustrated in FIG. 37 to the position illustrated in FIG. 38. Inversely, upshifting is done by closure of the upshifting electrical circuit once again powering the electriomagnet in the same conditions as previously.

Naturally, the invention is not strictly limited to its use in a chain/pinion type of context, but can also be adapted to any other type of transmission, as for example, the serrated belt and mesh type.

It must be noted that interrupters having a plurality of functions can also be used, in other words, having simultanaeously the interrupter function controlling upshifting and the interrupter function of controlling downshifting.

Naturally, the invention is not limited to the embodiments described and represented hereinabove, but also comprises all technical equivalents and combinations thereof.

We claim:

1. Gear shifting device for a cycle having a chain and pinion transmission, comprising:
   a mobile gear shift assembly adapted to laterally displace the chain for enabling passage from one gear to another gear;
   transformation means for transforming rotation of at least one pivoting gear into a lateral displacement of said mobile gear shift assembly; and
   control means for controlling lateral displacement of said mobile gear shift assembly.

2. Gear shifting device as defined by claim 1, wherein said transformation means comprise a guide ramp rotationally affixed to a gear, said guide ramp being adapted to cooperate with a control finger or with a transmission axis affixed to a mobile control shaft.

3. Gear shifting device as defined by claim 2, wherein said control means comprise an electrical power circuit comprising a battery and at least one interrupter controlling at least one of upshifting and downshifting.

4. Gear shifting device as defined by claim 3, wherein said control finger is biased in a retracted resting position by a compression spring.

5. Gear shifting device as defined by claim 4, wherein said control means comprise a metallic plunger, said metallic plunger being independent of the control finger, and said control finger is composed of non-magnetic material.

6. Gear shifting device as defined by claim 5, wherein said mobile gear shift assembly is connected to a frame of a cycle, and comprises an upper retention assembly on which said mobile gear shift assembly is movably mounted.

7. Gear shifting device as defined by claim 6, wherein said mobile gear shift assembly is positioned laterally slidable on said upper retention assembly along an axis concurrent with a general symmetrical plane of the cycle.

8. Gear shifting device as defined by claim 7, wherein said device is a rear gearshift.

9. Gear shifting device as defined by claim 8, wherein said mobile gear shift assembly comprises an upper return wheel and a lower return wheel pivoting at a lower portion of a connection arm.

10. Gear shifting device as defined by claim 9, wherein said mobile control shaft is slidably positioned inside a main casing sliding in a hole of said upper retention assembly.

11. Gear shifting device as defined by claim 9, wherein:
said mobile control shaft comprises at least one series of control teeth for controlling shifting; and
said control means comprise at least one control finger mobile between a retracted resting position and an active projecting position in which it is engaged against one of said control teeth, and an electromagnet adapted to be powered by current.

12. Gear shifting device as defined by claim 9, wherein:
said mobile control shaft comprises a series of teeth for controlling upshifting and a series of teeth for controlling downshifting; and
said upper retention assembly comprises two control devices, one of said two control devices comprising a first control device for upshifting, and the other of said two control devices comprising a second control device for downshifting, each of said first and second control devices comprising an electromagnet powered during closure, respectively, of an interrupter of interrupters controlling upshifting and an interrupter of interrupters controlling downshifting.

13. Gear shifting device as defined by claim 1, wherein said mobile gear assembly is laterally slidable along an axis which is downwardly inclined to form with a general symmetrical plane passing through the cycle an acute angle of between 90° and 40°.

14. Gear shifting device as defined by claim 2, wherein said mobile gear assembly is laterally slidable along an axis which is downwardly inclined to form with a general symmetrical plane passing through the cycle an acute angle α of between 90° and 40°.

15. Gear shifting device as defined by claim 14, wherein said mobile control shaft comprises a main side whose lower end is extended by a secondary side bearing said transmission axis, said main side laterally bearing two series of teeth and having a general axis forming an angle with an axis passing through said secondary side, said angle being substantially equal to said angle α.

16. Gear shifting device as defined by claim 14, wherein:
said mobile control shaft is slidably positioned inside and along a longitudinal axis of a main casing, said main casing being slidable in a hole of said upper retention assembly, said mobile control shaft comprising a main side comprising two series of teeth, an upper end and a lower end; and
a mobile intermediate arm having two ends, one end of said mobile intermediate arm being affixed to said transmission axis, and the other end of said mobile intermediate arm being journalled about an axis on said lower end of said main side.

17. Gear shifting device as defined by claim 1, comprising indexing means so as to define the position of the mobile gear shift assembly.

18. Gear shifting device as defined by claim 17, wherein said indexing means comprises a series of indexing hollows adapted to cooperate with a ball biased in an indexing position by a compression spring.

19. Gear shifting device as defined by claim 6, comprising indexing means so as to define the position of the mobile gear shift assembly, said indexing means being partially affixed to said upper retention assembly and partially affixed to said mobile gear shift assembly.

20. Gear shifting device as defined by claim 19, wherein said indexing means comprises a series of indexing hollows positioned on said main casing of said mobile gear shift assembly, said series of indexing hollows being adapted to cooperate with a ball affixed to said upper retention assembly and biased in an indexing position by a compression spring.

* * * * *